United States Patent
Huang et al.

(10) Patent No.: US 10,803,821 B2
(45) Date of Patent: Oct. 13, 2020

(54) LIQUID CRYSTAL DISPLAY PANEL WITH DIFFERENT POLARITY INVERSION POSITIONS FOR MULTIPLE COLUMNS OF PIXEL UNITS AND LIQUID CRYSTAL DISPLAY DEVICE

(71) Applicant: Xianyang Caihong Optoelectronics Technology Co., Ltd, Xianyang (CN)

(72) Inventors: Yusheng Huang, Xianyang (CN); Zihan Liu, Xianyang (CN); Yuyeh Chen, Xianyang (CN); Yuan-Liang Wu, Xianyang (CN)

(73) Assignee: XIANYANG CAIHONG OPTOELECTRONICS TECHNOLOGY CO., LTD., Xianyang (CN)

( * ) Notice: Subject to any disclaimer, the term of this patent is extended or adjusted under 35 U.S.C. 154(b) by 0 days.

(21) Appl. No.: 16/456,010

(22) Filed: Jun. 28, 2019

(65) Prior Publication Data
US 2020/0027412 A1    Jan. 23, 2020

(30) Foreign Application Priority Data

Jul. 23, 2018 (CN) .......................... 2018 1 08132717
Dec. 12, 2018 (CN) .......................... 2018 1 15211018
Dec. 12, 2018 (CN) .......................... 2018 1 15211041

(51) Int. Cl.
*G09G 3/36* (2006.01)
*G02F 1/1362* (2006.01)
*G02F 1/133* (2006.01)

(52) U.S. Cl.
CPC ....... *G09G 3/3614* (2013.01); *G02F 1/13306* (2013.01); *G02F 1/136286* (2013.01); *G09G 2310/08* (2013.01); *G09G 2320/0223* (2013.01); *G09G 2320/041* (2013.01); *G09G 2330/021* (2013.01)

(58) Field of Classification Search
CPC ............. G09G 3/3614; G09G 2310/08; G09G 2320/0223; G09G 2320/041; G09G 2320/021; G02F 1/13306; G02F 1/136286
See application file for complete search history.

(56) References Cited

U.S. PATENT DOCUMENTS

| | | | | |
|---|---|---|---|---|
| 2004/0070581 A1* | 4/2004 | Hiraki | ........... | G09G 3/2011 345/209 |
| 2006/0152464 A1* | 7/2006 | Ishii | ........... | G09G 3/3648 345/98 |
| 2015/0221265 A1* | 8/2015 | Huang | ........... | G09G 3/3614 345/690 |

* cited by examiner

*Primary Examiner* — Wing H Chow
(74) *Attorney, Agent, or Firm* — WPAT, PC

(57) ABSTRACT

The present invention discloses a liquid crystal display panel and a liquid crystal display device, the liquid crystal display panel includes: a plurality of data lines and a plurality of scan lines, wherein the plurality of data lines intersect with the plurality of scan lines to define X rows and Y columns of pixel units arranged in a matrix, S types of different polarity inversion positions are existed from an i-th column of pixel unit to an [i+(U−1)]-th column of pixel unit, where 0<i<Y, U≥4, S≥2, and U is a polarity inversion repetition period in a scan line direction. The liquid crystal display panel and the liquid crystal display device provided by the present invention can alleviate the phenomenon of horizontal equidistant horizontal stripes, and can reduce the problem of excessive power consumption and temperature increase caused by driving.

11 Claims, 9 Drawing Sheets

FIG. 2

|    | D1 | D2 | D3 | D4 | D5 | D6 | D7 | D8 | D9 | D10 | D11 | D12 | D13 | D14 | D15 | D16 | D17 | D18 | D19 | D20 |
|----|----|----|----|----|----|----|----|----|----|-----|-----|-----|-----|-----|-----|-----|-----|-----|-----|-----|
| G1 | P  | N  | N  | P  | P  | N  | N  | P  | P  | N   | N   | P   | P   | N   | N   | P   | P   | N   | N   | P   |
| G2 | P  | N  | N  | P  | N  | N  | P  | P  | P  | N   | N   | P   | P   | N   | N   | P   | P   | N   | N   | P   |
| G3 | P  | N  | N  | P  | N  | N  | P  | P  | N  | N   | P   | P   | P   | N   | N   | P   | P   | N   | N   | P   |
| G4 | P  | N  | N  | P  | N  | N  | P  | P  | N  | N   | P   | P   | N   | N   | P   | P   | P   | N   | N   | P   |
| G5 | P  | P  | N  | N  | N  | N  | P  | P  | N  | N   | P   | P   | N   | N   | P   | P   | P   | P   | N   | N   |
| G6 | P  | P  | N  | N  | N  | P  | P  | N  | N  | N   | P   | P   | N   | N   | P   | P   | P   | P   | N   | N   |
| G7 | P  | P  | N  | N  | N  | P  | P  | N  | N  | P   | P   | N   | N   | N   | P   | P   | P   | P   | N   | N   |
| G8 | P  | P  | N  | N  | N  | P  | P  | N  | N  | P   | P   | N   | N   | P   | P   | N   | P   | P   | N   | N   |
| G9 | N  | P  | P  | N  | N  | P  | P  | N  | N  | P   | P   | N   | N   | P   | N   | N   | N   | P   | P   | N   |
| G10| N  | P  | P  | N  | P  | P  | N  | N  | N  | P   | P   | N   | N   | P   | P   | N   | N   | P   | P   | N   |
| G11| N  | P  | P  | N  | P  | P  | N  | N  | P  | P   | N   | N   | N   | P   | P   | N   | N   | P   | P   | N   |
| G12| N  | P  | P  | N  | P  | P  | N  | N  | P  | P   | N   | N   | P   | P   | N   | N   | N   | P   | P   | N   |

FIG. 3

|     | D1 | D2 | D3 | D4 | D5 | D6 | D7 | D8 |
|-----|----|----|----|----|----|----|----|----|
| G1  | P  | N  | N  | P  | P  | N  | N  | P  |
| G2  | N  | N  | P  | P  | P  | N  | N  | P  |
| G3  | N  | N  | P  | P  | P  | P  | N  | N  |
| G4  | N  | P  | P  | N  | P  | P  | N  | N  |
| G5  | N  | P  | P  | N  | N  | P  | P  | N  |
| G6  | P  | P  | N  | N  | N  | P  | P  | N  |
| G7  | P  | P  | N  | N  | N  | N  | P  | P  |
| G8  | P  | N  | N  | P  | N  | N  | P  | P  |
| G9  | P  | N  | N  | P  | P  | N  | N  | P  |
| G10 | N  | N  | P  | P  | P  | N  | N  | P  |
| G11 | N  | N  | P  | P  | P  | P  | N  | N  |
| G12 | N  | P  | P  | N  | P  | P  | N  | N  |

|    | D1 | D2 | D3 | D4 | D5 | D6 | D7 | D8 | D9 | D10 | D11 | D12 | D13 | D14 | D15 | D16 | D17 | D18 | D19 | D20 |
|----|----|----|----|----|----|----|----|----|----|----|----|----|----|----|----|----|----|----|----|----|
| G1 | P | N | N | P | P | N | N | P | P | N | N | P | P | N | N | P | P | N | N | P |
| G2 | P | N | N | P | N | N | P | P | P | N | N | P | P | N | N | P | P | N | N | P |
| G3 | P | P | N | N | P | N | P | P | P | N | N | P | P | N | N | P | P | P | N | N |
| G4 | P | P | N | N | N | P | P | N | P | N | N | P | P | N | N | P | P | P | N | N |
| G5 | P | P | N | N | N | P | P | N | N | P | P | P | N | N | P | P | P | P | N | N |
| G6 | P | P | N | N | N | P | P | N | N | N | P | P | N | N | P | P | P | P | N | N |
| G7 | P | P | N | N | N | P | P | N | N | P | P | N | N | N | P | P | P | P | N | N |
| G8 | P | P | N | N | N | P | P | N | N | P | P | N | N | P | P | N | P | P | N | N |
| G9 | N | P | P | N | N | P | P | N | N | P | P | N | N | P | N | P | N | P | P | N |
| G10| N | P | P | N | P | P | N | N | N | P | P | N | N | P | P | N | N | P | P | N |
| G11| N | N | P | P | P | P | N | N | N | P | P | N | P | P | N | N | N | N | P | P |
| G12| N | N | P | P | P | N | N | P | N | P | P | N | N | P | P | N | N | N | P | P |

FIG. 6

|    | D1 | D2 | D3 | D4 | D5 | D6 | D7 | D8 | D9 | D10 | D11 | D12 | D13 | D14 | D15 | D16 | D17 | D18 | D19 | D20 |
|----|----|----|----|----|----|----|----|----|----|----|----|----|----|----|----|----|----|----|----|----|
| G1 | P | N | N | P | P | N | N | P | P | N | N | P | P | N | N | P | P | N | N | P |
| G2 | P | N | N | P | P | N | N | P | P | N | N | P | P | N | N | P | P | N | N | P |
| G3 | P | P | N | N | P | N | N | P | P | P | N | N | P | N | N | P | P | P | N | N |
| G4 | P | P | N | N | P | N | N | P | P | P | N | N | P | N | N | P | P | P | N | N |
| G5 | P | P | N | N | N | N | P | P | P | P | N | N | N | N | P | P | P | P | N | N |
| G6 | P | P | N | N | N | N | P | P | P | P | N | N | N | N | P | P | P | P | N | N |
| G7 | P | P | N | N | N | P | P | N | P | P | N | N | P | P | N | P | P | P | N | N |
| G8 | P | P | N | N | N | P | P | N | P | P | N | N | P | P | N | P | P | P | N | N |
| G9 | N | P | P | N | N | P | P | N | N | P | P | N | N | P | N | P | N | P | P | N |
| G10| N | P | P | N | N | P | P | N | N | P | P | N | N | P | P | N | N | P | P | N |
| G11| N | N | P | P | N | P | P | N | N | N | P | P | N | P | P | N | N | N | P | P |
| G12| N | N | P | P | N | P | P | N | N | N | P | P | N | P | P | N | N | N | P | P |

FIG. 7

|    | D1 | D2 | D3 | D4 | D5 | D6 | D7 | D8 | D9 | D10 | D11 | D12 | D13 | D14 | D15 | D16 |
|----|----|----|----|----|----|----|----|----|----|-----|-----|-----|-----|-----|-----|-----|
| G1 | P | N | N | P | P | N | N | P | P | N | N | P | P | N | N | P |
| G2 | P | N | N | P | N | N | P | P | P | N | N | P | P | N | N | P |
| G3 | P | N | N | P | N | N | P | P | N | N | P | P | P | N | N | P |
| G4 | P | N | N | P | N | N | P | P | N | N | P | P | N | N | P | P |
| G5 | P | P | N | N | N | N | P | P | N | N | P | P | N | N | P | P |
| G6 | P | P | N | N | N | P | P | N | N | N | P | P | N | N | P | P |
| G7 | P | P | N | N | N | P | P | N | P | P | N | N | N | N | P | P |
| G8 | P | P | N | N | N | P | P | N | N | P | N | N | P | P | N | N |
| G9 | N | P | P | N | N | P | P | N | N | P | P | N | N | P | P | N |
| G10 | N | P | P | N | P | P | N | N | N | P | P | N | N | P | P | N |
| G11 | N | P | P | N | P | P | N | N | P | P | N | N | N | P | P | N |
| G12 | N | P | P | N | P | P | N | N | P | P | N | N | P | P | N | N |
| G13 | N | N | P | P | P | N | N | N | P | P | N | N | P | P | N | N |
| G14 | N | N | P | P | P | N | N | P | P | P | N | N | P | P | N | N |
| G15 | N | N | P | P | P | N | N | P | P | N | N | P | P | P | N | N |
| G16 | N | N | P | P | P | N | N | P | P | N | N | P | P | N | N | P |

FIG. 10

|   | S1 | S2 | S3 | S4 |
|---|----|----|----|----|
| A | P | P | N | N |
| B | N | N | P | P |
| C | P | N | N | P |
| D | N | P | P | N |
| E | P | N | P | N |
| F | N | P | N | P |

FIG. 11

LIQUID CRYSTAL DISPLAY PANEL WITH DIFFERENT POLARITY INVERSION POSITIONS FOR MULTIPLE COLUMNS OF PIXEL UNITS AND LIQUID CRYSTAL DISPLAY DEVICE

FIELD OF THE DISCLOSURE

The present invention relates to the field of display technologies, and in particular to a liquid crystal display panel and a liquid crystal display device.

BACKGROUND OF THE DISCLOSURE

With the development of display technology, liquid crystal display (LCD) has gradually replaced the cathode ray tube (CRT) display device due to its advantages of lightness, thinness and low radiation. It is the most common display device in information terminals such as computers, smart phones, mobile phones, car navigation devices, and e-books.

In the liquid crystal panel display driving signal, in order to prevent the liquid crystal molecules from being cured, the AC driving method is used for driving. The commonly used inversion driving method is a little inversion driving mode, column inversion driving mode, row inversion driving mode, and 1+2 line inversion driving mode. Wherein, the 1+2 line inversion driving mode has better display quality and the power consumption is slightly lower than the dot inversion, so it is the most commonly used inversion driving method at present. However, in the case of the 1+2 line inversion driving mode, the temperature of the driving chip can reach 120° C. or even exceed 120° C. Therefore, the process of attaching the heat sink has to be taken to lower the operating temperature of the driving chip, which increases the production cost of the entire panel. Therefore, more and more N Line inversion driving methods are being used at present, and this driving method is a method of performing polarity inversion every N rows of pixel units. Therefore, the polarity inversion positions occur at the pixel positions of the same row, and the larger the value of N, the more significant the temperature at which the driving chip operates is lowered.

However, the output of the N Line inversion driving method in one frame of image is a kind of switching polarity of a time series loop. The problem of insufficient pixel charging due to the RC (Resistance Capacitance) delay effect causes a phenomenon of horizontal equidistant horizontal stripes on the liquid crystal panel, and the phenomenon of horizontal equidistant horizontal stripes is more pronounced when the value of N is larger.

SUMMARY OF THE DISCLOSURE

In order to solve the above problems in the prior art, the present invention provides a liquid crystal display panel and a liquid crystal display device.

Specifically, a liquid crystal display panel according to an embodiment of the present invention includes: a plurality of data lines and a plurality of scan lines, wherein the plurality of data lines intersect with the plurality of scan lines to define X rows and Y columns of pixel units arranged in a matrix, and X and Y are positive integers, S types of different polarity inversion positions are existed from an i-th column of pixel unit to an [i+(U−1)]-th column of pixel unit, where $0 < i < Y$, $U \geq 4$, $S \geq 2$, and U is a polarity inversion repetition period in a scan line direction.

In an embodiment of the invention, a polarity of a j-th pixel of the i-th column of pixel unit is opposite to a polarity of a (j+V)-th pixel of the i-th column of pixel unit, where j and V are positive integers and $V \geq 4$, and V is a polarity inversion period in a data line direction.

In an embodiment of the invention, a polarity of the i-th column of pixel unit is the same as a polarity of an (i+U)-th column of pixel unit.

In addition, a liquid crystal display device provided by an embodiment of the present invention includes: a timing controller, a source driving circuit, a gate driving circuit, and any one of the foregoing liquid crystal display panels; the timing controller is respectively connected to the source driving circuit and the gate driving circuit configured to perform timing control on the source driving circuit and the gate driving circuit; the source driving circuit is connected to the liquid crystal display panel configured to provide a data driving signal to the plurality of data lines; and the gate driving circuit is connected to the liquid crystal display panel configured to provide a scan driving signal to the plurality of scan lines.

In an embodiment of the invention, the source driving circuit includes: a first switching unit, configured to receive a first polarity digital signal, and rearrange each polarity position of the first polarity digital signal according to a polarity of each polarity position in the first polarity digital signal to obtain a second polarity digital signal; a polarity conversion unit, configured to perform polarity conversion on the second polarity digital signal to obtain a first polarity conversion signal; and a second switching unit, configured to perform position recovery on the first polarity switching signal according to the polarity of each polarity position in the first polarity digital signal, and obtain a second polarity switching signal configured to control S different polarity inversion positions between the i-th column of the pixel unit and the [i+(U−1)]-th column of the pixel unit.

In an embodiment of the invention, the first switch unit comprises N first switch modules, the first polarity digital signal comprises a plurality of sub polarity digital signals, each of the first switch modules is configured to receive the sub polarity digital signals according to a set interval; the polarity conversion unit comprises N polarity conversion modules, the polarity conversion module comprises a positive polarity conversion module and a negative polarity conversion module; when the polarity conversion module corresponding to a K-th stage first switch module is a positive polarity conversion module, the polarity conversion module corresponding to a (K+1)-th stage first switch module is a negative polarity conversion module, where N and K are both positive integers, and $1 \leq K \leq N$.

In an embodiment of the invention, a first stage first switch module and a N-th stage first switch module each comprise one first switch, a second stage first switch module to a (N−1)-th stage first switch module each comprise two first switches and one second switch; in the first stage first switch module, an input end of the first switch receives the first polarity digital signal, and a first output end of the first switch and a second output end of the first switch respectively connect two polarity conversion modules having different polarity conversion functions; in a M-th stage first switch module, an input end of the second switch receives the first polarity digital signal, and a first output end of the second switch and a second output end of the second switch are respectively connected to input ends of the two first switches, the first output end of the first switch and the second output end of the first switch are respectively connected to the two polarity conversion modules having different polarity conversion functions, where M is a positive integer, and 1<M<N; and in the N-th stage first switch module, the input end of the first switch receives the first polarity digital signal, and the first output end of the first switch and the second output end of the first switch are respectively connected to the two polarity conversion modules having different polarity conversion functions.

In an embodiment of the invention, in the first stage first switch module, the input end of the first switch receives the first polarity digital signal, the first output end of the first switch is connected to the first stage polarity conversion module, and the second output end of the first switch is connected to the second stage polarity conversion module; in the M-th stage first switch module, the input end of the second switch receives the first polarity digital signal, the first output end and the second output end of the second switch are respectively connected to the input ends of the two first switches, the first output ends of the first switches are respectively connected to the polarity conversion module of an upper stage and a lower stage, the second output ends of the first switches are respectively connected to the polarity conversion module of the current stage and the polarity conversion module of the lower/upper stage; and in the N-th stage first switch module, the input end of the first switch receives the N-th polarity digital signal, the first output end of the first switch is connected to the (N−1)-th stage polarity conversion module, and the second output end of the first switch is connected to the N-th stage polarity conversion module.

In an embodiment of the invention, the source driving circuit further comprises a data latch unit and a level shifting unit, the data latch unit comprises N data latches, the level shifting unit comprises N level shifters, and a P-th stage data latch and a P-th stage level shifter are sequentially connected between a P-th stage switching module and a P-th stage polarity conversion module, where P is a positive integer and $1 \leq P \leq N$.

In an embodiment of the invention, the second switching unit comprises N second switching modules, and the second polarity switching signal comprises a plurality of sub polarity conversion signals, each of the second switch modules is configured to output the sub polarity conversion signal according to a polarity of each of the polarity positions of the first polarity digital signal.

In an embodiment of the invention, a first stage second switch module and a N-th stage second switch module respectively comprise a third switch, a second stage second switch module to a (N−1)-th stage second switch module respectively comprises two third switches and one fourth switch; in the first stage second switch module, a first input end and a second input end of the third switch are respectively connected to the two polarity conversion modules having different polarity conversion functions, an output end of the third switch outputs a second polarity switching signal; in a M-th stage second switch module, the first input end and the second input end of the third switch are respectively connected to the two polarity conversion modules having different polarity conversion functions, the output end of the third switch is connected to an input end of the fourth switch, an output end of the fourth switch outputs a second polarity switching signal; and in the N-th stage second switch module, the first input end and the second input end of the third switch are respectively connected to the two polarity conversion modules having different polarity conversion functions, the output end of the third switch outputs a second polarity switching signal.

In an embodiment of the invention, in the first stage second switch module, the first input end of the third switch is connected to the first stage polarity conversion module, the second input end of the third switch is connected to the second stage polarity conversion module, the output end of the third switch outputs a second polarity switching signal; in the M-th stage second switch module, the first input end of the third switch is respectively connected to an upper stage and a lower stage polarity conversion module, the second input end of the third switch is respectively connected to the current stage polarity conversion module and the lower/upper stage polarity conversion module, the output end of the third switch is connected to the input end of the fourth switch, and the output end of the fourth switch outputs a second polarity switching signal; and in the N-th stage second switch module, the first input end of the third switch is connected to the N-th of stage the polarity conversion module, the second input end of the third switch is connected to the (N−1)-th stage polarity conversion module, the output of the third switch outputs a second polarity switching signal.

In an embodiment of the invention, the source driving circuit further comprises an output buffer unit, configured to buffer the first second polarity switching signal, the output buffer unit comprises N output buffers, and a q-th stage output buffer is connected between a q-th stage polarity conversion module and a q-th stage second switch module, where q is a positive integer and $1 \leq q \leq N$.

In an embodiment of the invention, the timing controller is configured to receive a first polarity digital signal, and rearrange the polarity positions corresponding to the first polarity digital signal to obtain a second polarity digital signal; and the source driving circuit is configured to perform polarity switching and position recovery on the second polarity digital signal to obtain a first polarity switching signal for controlling S different polarity inversion positions between the i-th column of the pixel unit and the [i+(U−1)]-th column of the pixel unit.

In an embodiment of the invention, the timing controller comprises a plurality of storage units, each storage unit comprises N storages, and the first polarity digital signal comprises a plurality of sub polarity digital signals, each of the storages configured to receive one sub polarity digital signal according to a preset rule.

In an embodiment of the invention, the source driving circuit comprises: a polarity converting unit, configured to perform polarity switching on the second polarity digital signal to obtain a second polarity switching signal; and a switch recovery unit, configured to perform position recovery on the second polarity switching signal according to a position of the first polarity digital signal to obtain the first polarity switching signal; the polarity conversion unit comprises N polarity conversion modules, and the polarity conversion module comprises a positive polarity conversion module and a negative polarity conversion module; when a K-th stage polarity conversion module is a positive polarity conversion module, a (K+1)-th stage polarity conversion module is a negative polarity conversion module, where N and K are positive integers, and $1 \leq K \leq N$; the switch recovery unit comprises N switch recovery modules, and the second polarity switching signal comprises a plurality of sub polarity conversion signals, the switch recovery module is configured to perform position recovery on the sub polarity conversion signal according to a position of the first polarity digital signal, a K-th stage switch recovery module comprises a plurality of switches, the input of which is connected to the K-th stage polarity conversion module, and the output of the switch is configured to control the polarity of different first polarity digital signals.

In an embodiment of the invention, the source driving circuit further comprises a data latch unit and a level shifting unit, the data latch unit comprises N data latches, and the level shifting unit comprises N level shifters, a K-th stage data latch and a K-th stage level shifter of are sequentially connected between a K-th stage storage unit of and the K-th stage polarity conversion module; and the source driving circuit further comprises an output buffer unit, and the output buffer unit comprises N output buffers, a K-th stage output buffer is connected between the K-th stage polarity conversion module and the K-th stage switch recovery module.

Compared with the prior art, the present invention has the following beneficial effects: the liquid crystal display panel provided by the embodiment of the present invention and any two columns of pixel units of the liquid crystal display have different polarity reversal positions, thereby reducing the phenomenon of horizontal equidistant horizontal stripes, and reducing the problem of excessive power consumption and temperature increase caused by driving.

BRIEF DESCRIPTION OF THE DRAWINGS

FIG. 2 is a schematic diagram of another liquid crystal display panel according to an embodiment of the present invention.

FIG. 3 is a schematic diagram of still another liquid crystal display panel according to an embodiment of the present invention.

FIG. 6 is a schematic diagram of still another liquid crystal display panel according to an embodiment of the present invention.

FIG. 7 is a schematic diagram of the other liquid crystal display panel according to an embodiment of the present invention.

FIG. 10 is a schematic structural diagram of a pixel unit according to an embodiment of the present invention.

FIG. 11 is a schematic diagram of a driving signal output result according to an embodiment of the present invention.

DETAILED DESCRIPTION OF PREFERRED EMBODIMENTS

The present invention will be further described in detail below with reference to specific embodiments, but the embodiments of the present invention are not limited thereto.

It should be noted that when an element is referred to as "connected" to another element, it can be directly connected to the other element or the central element. The terms "vertical", "horizontal", "left", "right", and the like, as used herein, are for illustrative purposes only and are not intended to be the only embodiment.

Embodiment 1

Figure 1:
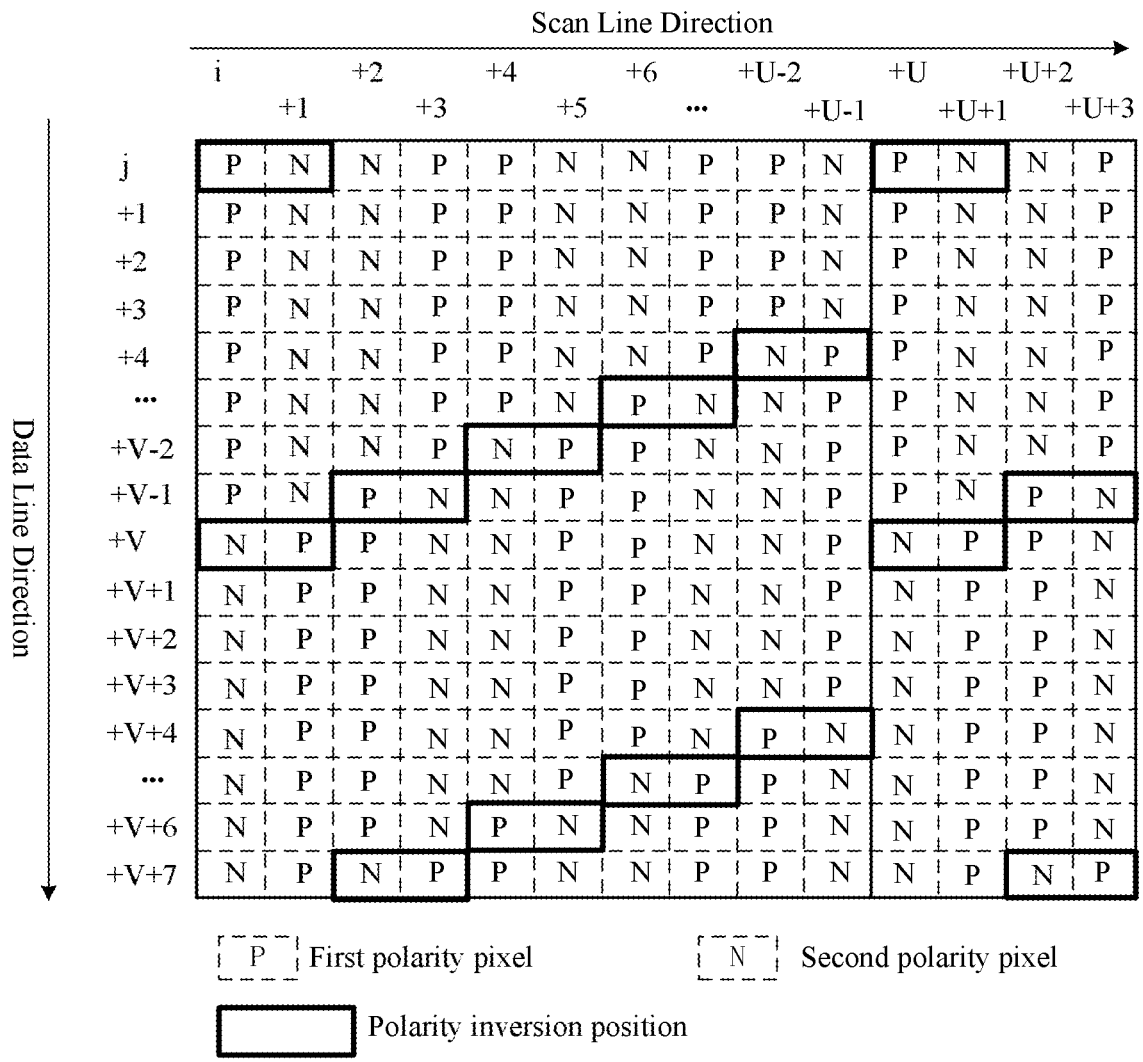
FIG. 1 is a schematic diagram of a liquid crystal display panel according to an embodiment of the present invention.

Referring to FIG. 1, FIG. 1 is a schematic diagram of a liquid crystal display panel according to an embodiment of the present invention. The liquid crystal display panel provided by the embodiment includes: a plurality of data lines parallel to each other and a plurality of scan lines parallel to each other.

The plurality of data lines and the plurality of scan lines are vertically aligned with each other, and the plurality of data lines intersect with the plurality of scan lines to define X rows and Y columns of pixel units arranged in a matrix, and X and Y are positive integers. Furthermore, there are S different polarity inversion positions between the i-th column of the pixel unit to the [i+(U−1)]-th column of the pixel unit, where $0<i<Y$, $U≥4$, $S≥2$.

Specifically, the polarity inversion position refers to a position where the polarity changes in any column of pixel units. For example, the i-th column of the j-th pixel to the [j+(V−1)]-th pixel of the pixel unit are all of the first polarity P such as a positive polarity, and the (j+V)-th pixel is a second polarity N such as a negative polarity, then the (j+V)-th pixel is the position where the polarity changes. Each column of pixel units is correspondingly connected to one data line, and each row of pixel units is correspondingly connected to one scan line. The data line is used to provide a data driving signal for the corresponding pixel unit, and the scan line is used to provide a scan driving signal for the corresponding pixel unit.

There are S different polarity inversion positions between the i-th column pixel unit and the [i+(U−1)]-th column pixel unit. For example, in FIG. 1, the value of U is 10, and the polarity inversion repeat period corresponding to the direction of the scan line is 10 columns of pixel units; the value of V is 8, and the polarity inversion period corresponding to the direction of the data line is 8 pixels; and the adjacent two columns of pixel units have the same polarity inversion position, so that the value of S is 5.

Specifically, the U-column pixel unit in each of the polarity inversion repeating periods in the scan line direction in the X rows and Y columns of pixel units has a plurality of different polarity inversion positions. However, the polarity inversion positions of all the data lines of the conventional N Line inversion driving method occur in the pixel positions of the same row, so that horizontal equidistant horizontal stripes appear on the liquid crystal display panel. The driving method of this embodiment shifts the pixels of the polarity inversion position between different data lines, thereby reducing the problem of insufficient pixel charging due to the RC delay effect. Thereby, the phenomenon of horizontal equidistant horizontal stripes on the liquid crystal display panel is slowed down, and the display quality of the liquid crystal display panel is improved.

The polarity of the i-th column of the j-th pixel of the pixel unit is opposite to the polarity of the (j+V)-th pixel, where j and V are positive integers and V≥4, and V is a period in which the polarity of each column of pixel units is inverted (or a polarity inversion period in the direction of the data line), for example, as shown in FIG. 1, when j is taken as 1, and V is taken as 8, the polarity of the first pixel unit to the eighth pixel unit of the pixel unit of the i-th column is the first polarity P such as positive polarity. The ninth pixel unit of the i-th pixel unit is opposite in polarity to the first pixel unit, and has a second polarity N such as a negative polarity.

When the V value is larger, the power consumption and temperature generated by the driving in the embodiment are lower, and the service life and display quality of the liquid crystal display panel can be improved.

The polarity of the pixel unit of the i-th column is the same as the polarity of the pixel unit of the (i+U)-th column.

Specifically, the polarity of all the pixel units in the pixel unit of the i-th column is the same as the polarity of all the pixel units of the corresponding position in the pixel unit of the (i+U)-th column, that is, the polarity inversion repetition period in the scan line direction in the X rows and Y columns of pixel units is the U column pixel unit.

The driving method of the embodiment can reduce the horizontal equidistant horizontal stripes phenomenon by distributing the polarity conversion position to different pixel positions, and improve the display quality of the liquid crystal display panel. At the same time, the power consumption and temperature generated by the driving can be reduced, the display quality of the liquid crystal display panel can be improved, and the service life of the liquid crystal display panel can be improved.

Embodiment 2

Referring to FIG. 2, FIG. 2 is a schematic diagram of still another liquid crystal display panel according to an embodiment of the present invention. The liquid crystal display panel provided by the embodiment includes: a plurality of data lines parallel to each other and a plurality of scan lines parallel to each other.

The plurality of data lines and the plurality of scan lines are vertically aligned with each other, and the plurality of data lines intersect with the plurality of scan lines to define X rows and Y columns of pixel units arranged in a matrix, and X and Y are positive integers, wherein the pixel units in the i-th column have S polarity inversion positions between the pixel units in the [i+(U−1)]-th column, where 0<i<Y, U≥4, S≥2.

Specifically, the polarity inversion position refers to a position where the polarity changes in any column of pixel units. If the first pixel to the a-th pixel of the pixel unit in the i-th column are both positive polarity and the (a+1)-th pixel is negative polarity, the (a+1)-th pixel is a position where the polarity changes. Each column of pixel units is correspondingly connected to one data line, and each row of pixel units is correspondingly connected to one scan line. The data line is used to provide a data driving signal for the corresponding pixel unit, and the scan line is used to provide a scan driving signal for the corresponding pixel unit.

There are a plurality of different polarity inversion positions between the i-th column pixel unit and the [i+(U−1)]-th column pixel unit. For example, as shown in FIG. 2, there are eight different polarity inversion positions between D1 and D16, and the polarity inversion repetition period corresponding to the scan line direction is 16 columns of pixel units, and the polarity inversion period in the data line direction is 8 pixels. Further, the i-th column pixel unit and the (i+1)-th column pixel unit have different polarity inversion positions.

Specifically, the polarity inversion positions of the column of pixel units in the single polarity inversion repetition period in the X rows and Y columns of pixel units are different. However, the polarity inversion positions of all the data lines of the conventional N Line inversion driving method occur in the pixel positions of the same row, so that horizontal equidistant horizontal stripes appear on the liquid crystal display panel. The driving method of this embodiment shifts the pixels of the polarity inversion position between different data lines, thereby reducing the problem of insufficient pixel charging due to the RC delay effect. Thereby, the phenomenon of horizontal equidistant horizontal stripes on the liquid crystal display panel is slowed down, and the display quality of the liquid crystal display panel is improved.

The polarity of the j-th pixel of the pixel unit of the i-th column is opposite to the polarity of the (j+V)-th pixel, where j and V are positive integers and V≥4, and V is a period in which the polarity of each column of pixel units is reversed. For example, when j is taken as 1, and V is taken as 8, the polarity of the first pixel to the eighth pixel of the pixel unit of the i-th column is the first polarity P such as positive polarity, the ninth pixel of the pixel unit of the i-th column is opposite in polarity to the first pixel, and is the second polarity N such as a negative polarity.

When the V value is larger, the power consumption and temperature generated by the driving in the embodiment are lower, and the service life and display quality of the liquid crystal display panel can be improved.

The polarity of the pixel unit of the i-th column is the same as the polarity of the pixel unit of the (i+U)-th column. For example, as shown in FIG. 2, the polarity of D1 is the same as the polarity of D17.

Specifically, the polarities of all the pixels in the pixel unit of the i-th column are the same as the polarities of all the pixels in the corresponding positions in the pixel unit of the (i+U)-th column, that is, the polarity inversion repetition period in the scan line direction in the X rows and Y columns of pixel units is a U column pixel unit, for example, 16 columns of pixel units.

The polarity of the pixel unit of the i-th column is opposite to the polarity of the pixel unit of the (i+2)-th column. For example, the polarities of the pixel units such as D1 and D3 and D2 and D4 shown in FIG. 2 are opposite.

Specifically, the polarity of all pixels in the i-th column of pixel units is opposite to the polarity of all pixels in corresponding positions in the (i+2)-th column of pixel units.

The i-th column pixel unit and the i-th column electrode have different polarity inversion positions.

Specifically, the position in which the pixel inversion is reversed in the i-th column of the pixel unit and the position in which the polarity is inverted in the (i+4)-th column of the pixel region occur at the pixel position of the pixel unit of the different row.

The driving method of the embodiment can reduce the horizontal equidistant horizontal stripes phenomenon by distributing the polarity conversion position to different pixel positions, and improve the display quality of the liquid crystal display panel. At the same time, the power consumption and temperature generated by the driving can be reduced, the display quality of the liquid crystal display panel can be improved, and the service life of the liquid crystal display panel can be improved.

Embodiment 3

In order to better illustrate the liquid crystal display panel of the present invention, the present embodiment will be described in detail based on a specific liquid crystal display panel.

Figures 4, 5:
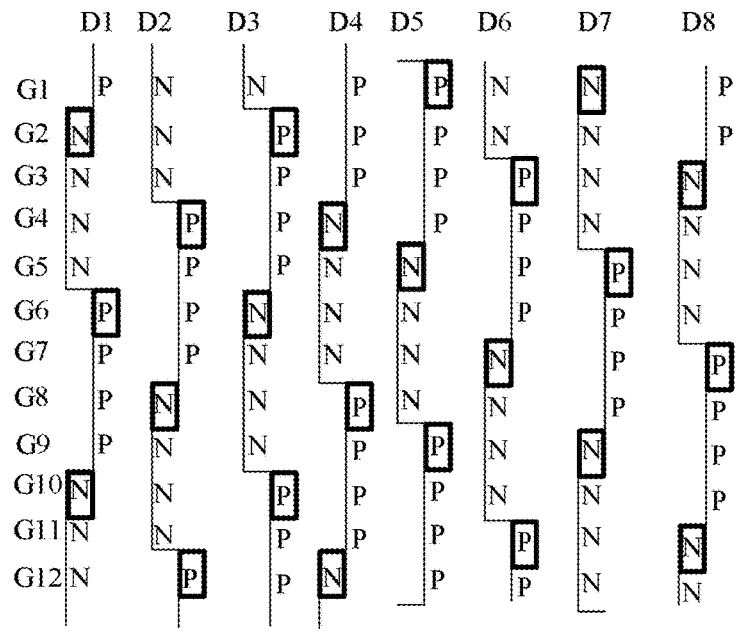
FIG. 4 is a schematic diagram of the other liquid crystal display panel according to an embodiment of the present invention.
FIG. 5 is a schematic diagram of another liquid crystal display panel according to an embodiment of the present invention.

Referring to FIG. 3 and FIG. 4 together, FIG. 3 is a schematic diagram of still another liquid crystal display panel according to an embodiment of the present invention. FIG. 4 is a schematic diagram of the other liquid crystal display panel according to an embodiment of the present invention. This embodiment provides a pixel unit of 12 rows and 8 columns, wherein the value of U is 8, the value of V is 4, and the value of S is 4.

Specifically, the polarity inversion positions of any two adjacent columns of pixel units are different. For example, the polarity inversion position of the pixel unit D1 of the first column occurs at the pixel position of the pixel unit G2 of the second row, the pixel position of the pixel unit G6 of the sixth row, and the pixel position of the pixel unit G10 of the tenth row; the polarity inversion position of the pixel unit D2 of the second column occurs at the pixel position of the pixel unit G4 in the fourth row, the pixel position of the pixel unit G8 in the eighth row, and the pixel position of the pixel unit G12 in the twelfth row.

Specifically, the arrangement of pixel polarities between any two columns of pixel units in the first column to the eighth column is different. For example, the first pixel of the pixel unit of the first column is a first polarity P such as a positive polarity pixel, the second pixel to the fifth pixel of the pixel unit of the first column are arranged with a second polarity N such as a negative polarity pixel, the sixth pixel to the ninth pixel of the pixel unit of the first column are arranged as positive polarity pixels, the pixels from the tenth pixel to the twelfth pixel of the pixel unit of the first column are negative polarity; the first pixel and the second pixel of the pixel unit of the eighth column are arranged as positive pixels, the third pixel to the sixth pixel of the pixel unit of the eighth column are arranged as negative polarity pixels, the pixels from the seventh pixel to the tenth pixel of the pixel unit of the eighth column are positive polarity, the eleventh pixel and the twelfth pixel of the pixel unit of the eighth column are arranged as negative polarity pixels.

Specifically, for every 4 pixels in any column of pixel units, the polarity is reversed once. For example, the second pixel to the fifth pixel of the pixel unit D1 of the first column are both of the second polarity N such as a negative polarity, and the sixth pixel to the ninth pixel of the pixel unit D1 of the first column are both of the first polarity P such as a positive polarity.

Specifically, the polarity inversion positions of the first column pixel unit D1 and the third column pixel unit D3 are both the pixel position of the second row pixel unit G2, the pixel position of the sixth row pixel unit G6, and the pixel position of the tenth row pixel unit G10. The polarity inversion positions of the second column pixel unit D2 and the fourth column pixel unit D4 are both the pixel position of the fourth row pixel unit G4, the pixel position of the eighth row pixel unit G8, and the pixel position of the 12th row pixel unit G12. The polarity inversion positions of the fifth column pixel unit D5 and the seventh column pixel unit D7 are both the pixel position of the first row pixel unit G1, the pixel position of the fifth row pixel unit G5, and the pixel position of the ninth row pixel unit G9. The polarity inversion positions of the sixth column pixel unit D6 and the eighth column pixel unit D8 are the pixel position of the third row pixel unit G3, the pixel position of the seventh row pixel unit G7, and the pixel position of the eleventh row pixel unit G11.

Specifically, the polarity of the first column pixel unit D1 is opposite to the polarity of the pixel position corresponding to the third column pixel unit D3. The polarity of the second column pixel unit D2 is opposite to the polarity of the pixel position of the fourth column pixel unit D4. The polarity of the fifth column pixel unit D5 is opposite to the polarity of the pixel position of the seventh column pixel unit D7. The polarity of the sixth column pixel unit D6 is opposite to the polarity of the pixel position corresponding to the eighth column pixel unit D8.

Specifically, the first column pixel unit D1 and the fifth column pixel unit D5 have different polarity inversion positions. The second column pixel unit D2 and the sixth column pixel unit D6 have different polarity inversion positions. The third column pixel unit D3 and the seventh column pixel unit D7 have different polarity inversion positions. The fourth column pixel unit D4 and the eighth column pixel unit D8 have different polarity inversion positions.

This embodiment provides a driving method in which the V value is 4, and by assigning the polarity conversion position to different pixel positions, thereby reducing the horizontal equidistant horizontal stripes in the liquid crystal display panel and improving the display quality of the liquid crystal display panel. At the same time, the power consumption and temperature generated by the driving can be reduced.

Embodiment 4

In order to better illustrate the liquid crystal display panel of the present invention, the present embodiment will be described in detail based on a specific liquid crystal display panel.

Please refer to FIG. 2 again. This embodiment provides a pixel unit of 12 rows and 20 columns, wherein the value of V is 8 and the value of U is 16.

Specifically, the polarity inversion positions of any two adjacent columns of pixel units are different. For example, the polarity inversion position of the first column pixel unit D1 occurs at the pixel position of the ninth row pixel unit G9, and the polarity inversion position of the second column pixel unit D2 occurs in the pixel position of the fifth row pixel unit G5.

Specifically, the arrangements of pixel polarities between any two columns of pixel units from the first column to the sixteenth column are different. The arrangements of pixel polarities in the pixel units from the seventeenth column to the twentieth column are the same as the arrangement of the pixel units in the first column to the fourth column, respectively.

Specifically, the first pixel to the eighth pixel of the pixel unit of the first column are arranged with a first polarity P such as a positive polarity pixel, the ninth pixel to the twelfth pixel are arranged with a second polarity N such as a negative polarity pixel, the first pixel and the seventh pixel of the pixel unit of the sixteenth column are arranged as positive polarity pixels, and the eighth pixel to the twelfth pixel are arranged as negative polarity pixels.

Specifically, for every 8 pixels in any column of pixel units, the polarity is reversed once. For example, the first pixel to the eighth pixel of the pixel unit D3 in the third column are all negative polarity, and the ninth pixel to the twelfth pixel are all positive polarity.

Specifically, the polarity inversion position of the first column pixel unit D1 and the third column pixel unit D3 is the pixel position of the ninth row pixel unit G9. The polarity inversion position of the second column pixel unit D2 and the fourth column pixel unit D4 is the pixel position of the fifth row pixel unit G5. The polarity inversion positions of the fifth column pixel unit D5 and the seventh column pixel unit D7 are the pixel position of the second row pixel unit G2 and the pixel position of the tenth row pixel unit G10. The polarity inversion position of the sixth column pixel unit D6 and the eighth column pixel unit D8 is the pixel position of the sixth row pixel unit G6. The polarity inversion positions of the ninth column pixel unit D9 and the eleventh column pixel unit D11 are the pixel position of the third row pixel unit G3 and the pixel position of the eleventh row pixel unit G11. The polarity inversion position of the tenth column pixel unit D10 and the twelfth column pixel unit D12 is the pixel position of the seventh row pixel unit G7. The polarity inversion positions of the thirteenth column pixel unit D13 and the fifteenth column pixel unit D15 are the pixel position of the fourth row pixel unit G4 and the pixel position of the twelfth row pixel unit G12. The polarity inversion position of the fourteenth column pixel unit D14 and the sixteenth column pixel unit D16 is the pixel position of the eighth row pixel unit G8.

Specifically, the polarity of the first column pixel unit D1 is opposite to the polarity of the pixel position corresponding to the third column pixel unit D3. The polarity of the second column pixel unit D2 is opposite to the polarity of the pixel position of the fourth column pixel unit D4. The polarity of the fifth column pixel unit D5 is opposite to the polarity of the pixel position of the seventh column pixel unit D7. The polarity of the sixth column pixel unit D6 is opposite to the polarity of the pixel position corresponding to the eighth column pixel unit D8, and so on, the polarity of the pixel unit of the i-th column is opposite to the polarity of the pixel unit of the (i+2)-th column.

Specifically, the first column pixel unit D1 and the fifth column pixel unit D5 have different polarity inversion positions. The second column pixel unit D2 and the sixth column pixel unit D6 have different polarity inversion positions. The third column pixel unit D3 and the seventh column pixel unit D7 have different polarity inversion positions. The fourth column pixel unit D4 and the eighth column pixel unit D8 have different polarity inversion positions, and so on. The pixel unit in the i-th column has different polarity inversion positions from the pixels in the (i+4)-th column.

Please refer to FIG. 5, FIG. 6, and FIG. 7, respectively. FIG. 5 is a schematic diagram of another liquid crystal display panel according to an embodiment of the present invention. FIG. 6 is a schematic diagram of still another liquid crystal display panel according to an embodiment of the present invention. FIG. 7 is a schematic diagram of the other liquid crystal display panel according to an embodiment of the present invention. FIG. 5 to FIG. 7 respectively provide three 12-row and 20-column pixel units, wherein V has a value of 8, and U has a value of 16. The liquid crystal display panel of the embodiment may further include other forms of pixel units of X rows and Y columns, wherein U and V may be valued according to the actually used liquid crystal display panel. It will be apparent to those skilled in the art that various modifications can be readily made to these embodiments and the general principles described herein can be applied to other embodiments without the inventive work. Therefore, the present invention is not limited to the embodiments described above, and those skilled in the art should be able to make modifications and changes within the scope of the invention without departing from the scope of the invention.

This embodiment provides a plurality of driving modes in which the V value is taken as 8, and the pixels of different data lines that need to be reversed in polarity are staggered by allocating the polarity switching positions to different pixel positions. Thereby, the horizontal equidistant horizontal stripes phenomenon in the liquid crystal display panel is reduced, the display quality of the liquid crystal display panel is improved, and at the same time, the power consumption and temperature generated by the driving can be reduced.

Embodiment 5

Figure 8:
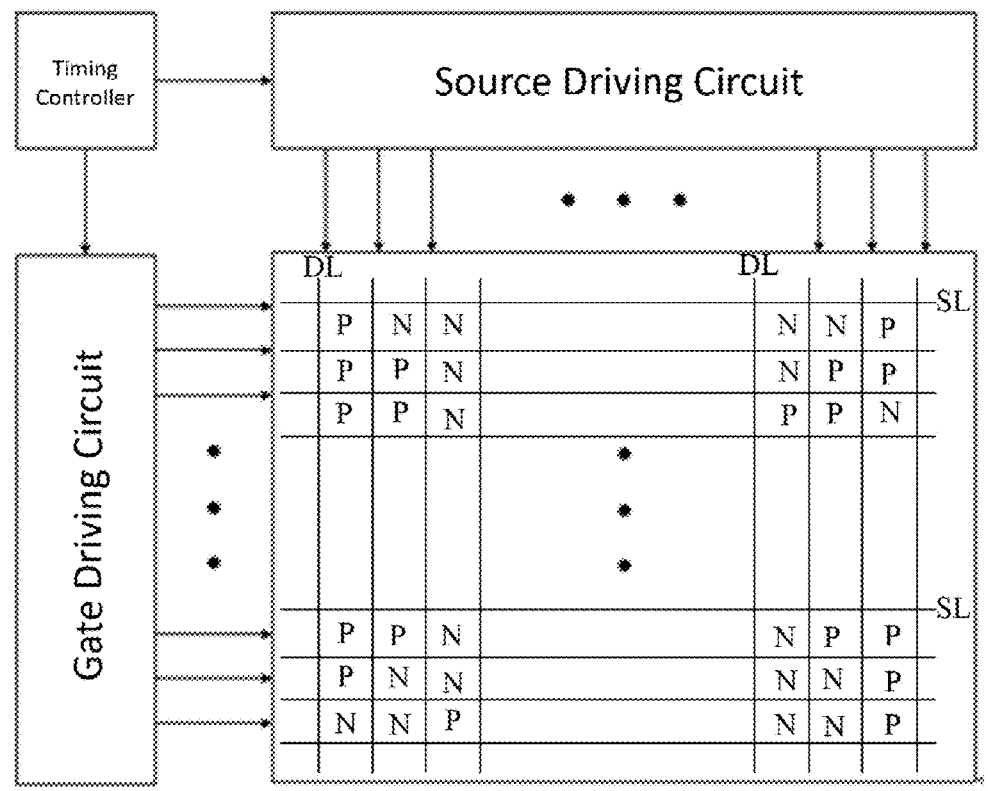
FIG. 8 is a schematic diagram of a liquid crystal display device according to an embodiment of the present invention.

This embodiment describes the liquid crystal display device proposed by the present invention in detail based on the above embodiments. As shown in FIG. 8, the liquid crystal display device of the embodiment includes the liquid crystal display panel, the timing controller, the source driving circuit and the gate driving circuit provided by any of the above embodiments. Wherein, the timing controller is respectively connected to the source driving circuit and the gate driving circuit, and the timing controller is used for timing control of the source driving circuit and the gate driving circuit; the source driving circuit is connected to the liquid crystal display panel, and the source driving circuit is configured to supply the data driving signal to the plurality of data lines DL; the gate driving circuit is connected to the liquid crystal display panel, and the gate driving circuit is configured to supply the scan driving signals to the plurality of scan lines SL.

Embodiment 6

Figure 9:
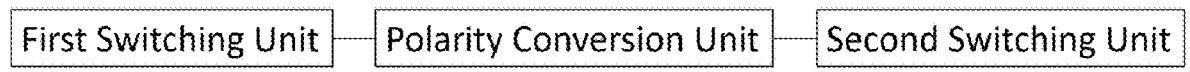
FIG. 9 is a schematic diagram of a source driving circuit according to an embodiment of the present invention.

Referring to FIG. 9, FIG. 9 is a schematic diagram of a source driving circuit according to an embodiment of the present invention. The source driving circuit of this embodiment includes:

a first switching unit, configured to receive a first polarity digital signal, and rearrange each polarity position of the first polarity digital signal according to a polarity of each polarity position in the first polarity digital signal to obtain a second polarity digital signal;

a polarity conversion unit, configured to perform polarity conversion on the second polarity digital signal to obtain a first polarity conversion signal; and a second switching unit, configured to perform position recovery on the first polarity switching signal according to a polarity of each polarity position in the first polarity digital signal to obtain a second polarity switching signal.

In the embodiment of the present invention, the position of the first polarity digital signal is rearranged by the first switching unit to obtain the second polarity digital signal. And performing polarity switching on the second polarity digital signal after the position rearrangement by the polarity conversion unit, thereby obtaining the first polarity switching signal. And recovering the position of the first polarity switching signal by using the second switching unit, so that the output driving signal is output to a corresponding position of the display panel. Therefore, the source driving circuit is applicable not only to the conventional polarity inversion method but also to the interleaved polarity inversion method. Further, the phenomenon of horizontal equidistant horizontal stripes of the display panel is reduced, and the temperature at which the driving chip operates can also be reduced.

The source driving circuit of the embodiment of the invention is applicable not only to the dot inversion driving mode, column inversion driving method, line inversion driving method, the 1+2 line inversion driving mode and the N Line inversion driving mode, but also to the interleaved polarity inversion method. The interleaved polarity inversion method means that there are S different polarity inversion positions between the i-th column sub-pixel of the pixel matrix and the [i+(U−1)]-th column sub-pixel, where U is the polarity inversion repetition period in the direction of the scan line. Specifically, the liquid crystal display panel includes a plurality of data lines parallel to each other and a plurality of scan lines parallel to each other. The plurality of data lines and the plurality of scan lines are vertically arranged to each other. The plurality of data lines intersect with the plurality of scan lines to define a matrix of X rows and Y columns arranged in a matrix, and X and Y are positive integers, wherein the i-th column sub-pixel and the [i+(U−1)]-th column sub-pixel have different polarity inversion positions, where 0<i<Y, U⩾4, S⩾2.

Specifically, the polarity inversion position refers to a position where the polarity changes in any one of the columns of sub-pixels. When the first sub-pixel to the a-th sub-pixel of the i-th sub-pixel are all positive polarity, and the (a+1)-th sub-pixel is negative polarity, the (a+1)-th sub-pixel is a position where the polarity changes. Each column of sub-pixels is connected to one data line, and each row of sub-pixels is connected to one scan line. The data line is used to provide a data signal for the corresponding sub-pixel driving circuit, and the scan line is used to provide a scan signal for the corresponding sub-pixel driving circuit.

For example, referring to FIG. 10, the pixel matrix includes 16 rows and 16 columns of sub-pixels. The polarity inversion position of the first column sub-pixel D1 occurs at the pixel position of the ninth row sub-pixel G9. The polarity inversion position of the second column sub-pixel D2 occurs at the pixel position of the fifth row sub-pixel G5 and the pixel position of the thirteenth row sub-pixel G13. The polarity inversion position of the third column sub-pixel D3 occurs in the ninth row sub-pixel G9, and so on, which is an interleaved polarity inversion method.

The interleaved polarity inversion method can reduce the horizontal equidistant horizontal stripes by assigning the polarity conversion position to different pixel positions, and improve the display quality of the liquid crystal display panel. At the same time, the power consumption and temperature generated by the driving can be reduced, the display quality of the liquid crystal display panel can be improved, and the service life of the liquid crystal display panel can be improved.

Referring to FIG. 11, the implementation of the interleave polarity inversion method for performing polarity inversion every 8 rows is required to output a driving signal as shown in FIG. 11. That is, the combination A (the polarity arrangement of the sub-pixels is PPNN), the combination B (the polarity of the sub-pixels is NNPP), the combination C (the polarity of the sub-pixels is PNNP), the combination D (the polarity of the sub-pixels is NPPN), the combination E (the polarity of the sub-pixels is PNPN) and the combination F (the polarity of the sub-pixels is NPNP) in FIG. 11 can be output. At present, the driving circuit for the source driver can only realize the combination of the four polarity outputs of the combination C to the combination F, but the combination of the two polarity outputs of the combination A and the combination B cannot be realized. Therefore, the current source driver circuit is not suitable for the interleaved polarity inversion method.

In a specific embodiment, the source driving circuit includes an N-level source driver. That is, the source driving circuit includes N source drivers, and each of the source drivers includes one first switching module, one polarity switching module, and one second switching module. Wherein each source driver receives a plurality of rows of first polarity digital signals transmitted by TCON (Timing Controller), and each row of first polarity digital signals reflects the polarity of each row of pixel units. As shown in FIG. 10, the first polarity digital signal as the first row of the pixel matrix is PNNPPNNPPNNPPNNP.

In a specific embodiment, the first switching unit is configured to receive the first polarity digital signal, rearrange each polarity position of the first polarity digital signal according to a polarity of each polarity position in the first polarity digital signal to obtain a second polarity digital signal.

Specifically, the first switch unit includes an N-level first switch module, that is, the first switch unit includes N first switch modules, the first polarity digital signal includes a plurality of sub polarity digital signals, and each of the first switching modules is configured to receive the sub polarity digital signals at set intervals.

Further, when the first switching unit receives the first polarity digital signal, the sub polarity digital signal is correspondingly transmitted to the first switching module according to the set interval. The first switch module rearranges the position according to the polarity characteristics of each sub polarity digital signal, thereby obtaining a sub polarity digital signal after the position rearrangement, all sub polarity digital signals after position rearrangement constitute a second polarity digital signal, for example, transmitting the sub polarity digital signal received by the first stage first switching module to the second stage first switching module, the first stage first switch module and the second stage first switch module control different polarity positions, thereby realizing position rearrangement.

Further, the polarity of each sub-pixel corresponding to the first polarity digital signal represents one sub polarity digital signal, and each first switch module receives the sub polarity digital signal according to the set interval, the setting interval is set according to the number of the first switch modules. If the number of the first switch modules is m, the set interval is every m sub polarity digital signals. If the number of the first switch modules is four, then the set interval is every four sub polarity digital signals. That is, each first switch module receives one sub polarity digital signal of one of the first polarity digital signals according to every four sub polarity digital signals.

Figure 12:
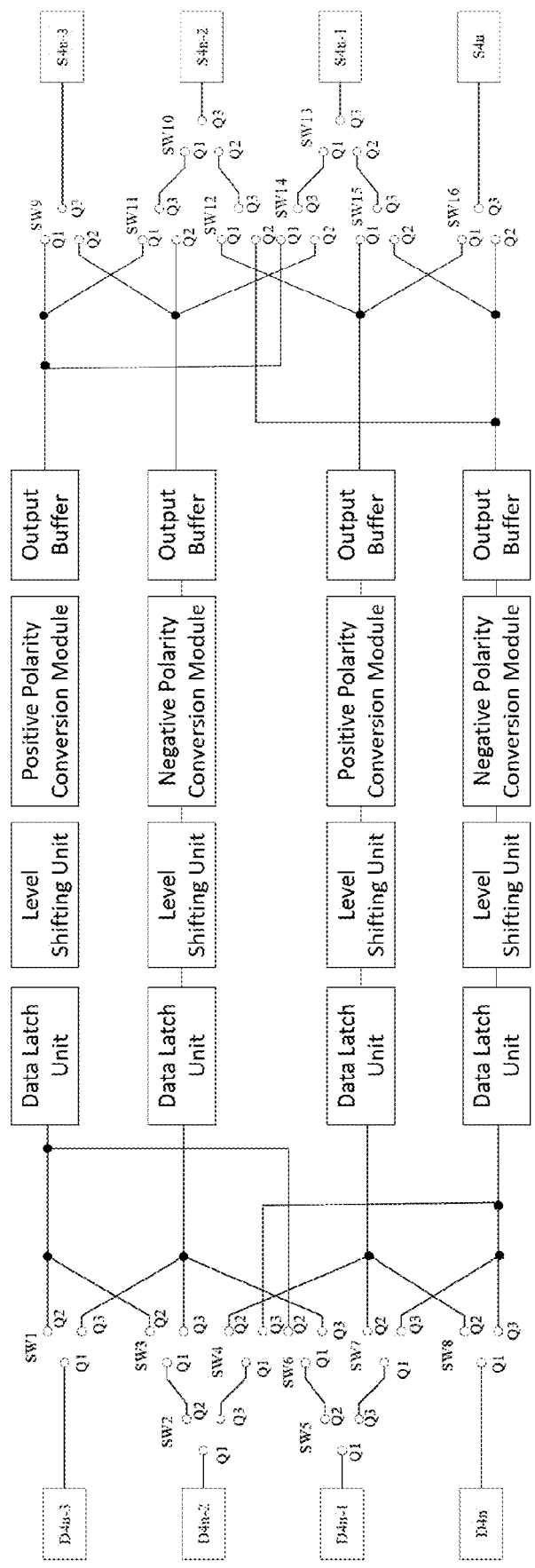
FIG. 12 is a schematic diagram of another source driving circuit according to an embodiment of the present invention.

For example, as shown in FIGS. 10 and 12, The first polarity digital signal of the first row includes a total of 16 sub polarity digital signals, and the number of the first switching modules is four, then transmit the polarity data of the first sub polarity digital signal, the fifth sub polarity digital signal, the ninth sub polarity digital signal and the thirteenth sub polarity digital signal of the first polarity digital signal of the row to the first stage first switching module; transmit the polarity data of the second sub polarity digital signal, the sixth sub polarity digital signal, the tenth sub polarity digital signal, and the fourteenth sub polarity digital signal to the second stage first switching module; transmit the polarity data of the third sub polarity digital signal, the seventh sub polarity digital signal, the eleventh sub polarity digital signal, and the fifteenth sub polarity digital signal to the third stage first switching module; and transmit the polarity data of the fourth sub polarity digital signal, the eighth sub polarity digital signal, the twelfth sub polarity digital signal, and the sixteenth sub polarity digital signal to the fourth stage first switching module, and so on.

In a specific embodiment, the polarity switching unit is configured to perform polarity conversion on the second polarity digital signal to obtain a first polarity switching signal, wherein the first polarity switching signal is an analog signal.

The polarity conversion unit is configured to perform polarity conversion on the sub polarity digital signal that is rearranged by the first switch module, transmit the sub polarity digital signal received by the first stage first switch module to the second stage first switch module. The polarity conversion module corresponding to the first switch module of the second stage is a negative polarity conversion module, and the polarity of the analog signal output by the sub polarity digital signal through the polarity conversion module is negative polarity. The analog signal corresponding to all the sub polarity digital signals after the polarity conversion is the first polarity switching signal.

Specifically, the polarity conversion unit includes an N-level polarity conversion module, that is, the polarity conversion unit includes N polarity conversion modules, the polarity conversion module includes a positive polarity conversion module and a negative polarity conversion module. And when the polarity conversion module corresponding to the first switch module of the K-th stage is a positive polarity conversion module, the polarity conversion module corresponding to the first switch module of the (K+1)-th stage is a negative polarity conversion module, where N and K are both positive integers, and $1 \leq K \leq N$.

For example, see FIG. 12, the polarity conversion module corresponding to the first switch module of the first stage is a positive polarity conversion module, the polarity conversion module corresponding to the first switch module of the second stage is a negative polarity conversion module, the polarity conversion module corresponding to the first switch module of the third stage is a positive polarity conversion module, and the polarity conversion module corresponding to the first level switch module of the fourth stage is a negative polarity conversion module.

In a specific embodiment, a second switching unit, configured to perform position recovery on the first polarity switching signal according to a polarity of each polarity position in the first polarity digital signal, to obtain a second polarity switching signal, where the second polarity switching signal is an analog signal.

Further, the second switch unit includes an N-level second switch module, that is, the second switch unit includes N second switch modules, the second polarity switching signal includes a plurality of sub polarity conversion signals, each of the second switch modules is configured to output the sub polarity conversion signal according to a polarity of each of the polarity positions of the first polarity digital signal.

The second polarity switching signal is a position recovery of the first polarity switching signal after the position of the first switching unit is rearranged by the second switching unit. For example, the sub polarity digital signal received by the first stage first switch module is transmitted to the second stage first switch module, and the analog signal corresponding to the sub polarity digital signal is restored to the original pixel position by the second stage second switch module. That is, the analog signal controlled by the second switching module of the first stage is restored, so that the second switching module of the first stage correctly controls the polarity of its corresponding pixel position.

For example, as shown in FIGS. 10 and 12, the first polarity digital signal of the first row includes a total of 16 sub polarity digital signals, and the number of the second switch modules is four. The second switch module of the first stage controls the polarity of the position of the first sub polarity digital signal according to the sub polarity conversion signal corresponding to the first sub polarity digital signal of the first polarity digital signal of the row, the second switch module of the first stage controls the polarity of the position of the fifth sub polarity digital signal according to the sub polarity conversion signal corresponding to the fifth sub polarity digital signal of the first polarity digital signal of the row, the second switch module of the first stage controls the polarity of the position of the ninth sub polarity digital signal according to the sub polarity conversion signal corresponding to the ninth sub polarity digital signal of the first polarity digital signal of the row, the second switch module of the first stage controls the polarity of the position of the thirteenth sub polarity digital signal according to the corresponding sub polarity conversion signal of the thirteenth sub polarity digital signal of the first polarity digital signal of the row; the second switch module of the second stage controls the polarity of the position of the second sub polarity digital signal according to the sub polarity conversion signal corresponding to the second sub polarity digital signal of the first polarity digital signal of the row, the second switch module of the second stage controls the polarity of the position of the sixth sub polarity digital signal according to the sub polarity conversion signal corresponding to the sixth sub polarity digital signal of the first polarity digital signal of the row, the second switch module of the second stage controls the polarity of the position of the tenth sub polarity digital signal according to the sub polarity conversion signal corresponding to the tenth sub polarity digital signal of the first polarity digital signal of the row, the second switch module of the second stage controls the polarity of the position of the fourteenth sub polarity digital signal according to the sub polarity conversion signal corresponding to the fourteenth sub polarity digital signal of the first polarity digital signal of the row, and so on, to complete the polarity setting the pixel matrix.

In a specific embodiment, the first switch module of the first stage and the first switch module of the N-th stage respectively include a first switch, the first switch module of the second stage to the first switch module of the (N−1)-th stage respectively includes two first switches and one second switch. Wherein, in the first switch module of the first stage, the input end of the first switch receives the first polarity digital signal, and the first output end and the second output end respectively connect two polarity conversion modules having different polarity conversion functions; in the first switch module of the M-th stage, the input end of the second switch receives the first polarity digital signal, and the first output end and the second output end are respectively connected to the input ends of the two first switches, the first output end and the second output end of the first switch are respectively connected to the two polarity conversion modules having different polarity conversion functions, wherein M is a positive integer, and 1<M<N; in the first switch module of the N-th stage, the input end of the first switch receives the first polarity digital signal, and the first output end and the second output end are respectively connected to the two polarity conversion modules having different polarity conversion functions.

Specifically, in the first switch module of the first stage, the input end of the first switch receives the first polarity digital signal, the first output end is connected to the polarity conversion module of the first stage, and the second output end is connected to the polarity conversion module of the second stage; in the first switch module of the M-th stage, the input end of the second switch receives the first polarity digital signal, and the first output end and the second output end of the second switch are respectively connected to the input ends of the two first switches, the first output end of the first switch is respectively connected to the polarity conversion module of the upper stage and the next stage, the second output end of the first switch is respectively connected to the polarity conversion module of the current stage and the polarity conversion module of the lower/upper stage; in the first switch module of the N-th stage, the input end of the first switch receives the N-th polarity digital signal, the first output end of the first switch is connected to the polarity conversion module of the (N−1)-th stage, the second output end of the first switch is connected to the N-th stage polarity conversion module.

Further, the first switch module of the first stage and the N-th stage first switch module respectively include one first switch, the first switch module of the second stage to the first switch module of the (N−1)-th stage respectively include two first switches and one second switch. Wherein one output of the first switch module of the first stage is connected to the first stage polarity conversion module, the other output end is connected to one output end of one of the first switch modules of the second stage, and the output of the first switch of the second stage first switch module is further connected to the second stage polarity conversion module; input of the second switch of the first switch module of B-th stage inputs the B-th first polarity digital signal, one output end of the second switch of the B-th stage first switch module is connected to the input end of one of the first switch modules of the B-th stage, the other output is connected to the input end of the other one of the first switch modules of the B-th stage; one output of one of the first switches of the first switch module of the B-th stage is connected to the B-th polarity switching module, the other output end of the first switch in the first switch module of the B-th stage is connected to one output end of one of the first switch modules of the C-th stage, and the output of the first switch of the first switch module of the C-th stage is further connected to the C-th polarity switching module; one output of the other one of the first switch modules of the B-th stage is connected to one output of one of the first switch modules of the D-th stage, the other output end of the first switch in the first switch module of the B-th stage is connected to one output end of one of the first switch modules of the E-th stage, and the output end of the first switch in the first switch module of the E-th stage is connected to the E-th stage polarity conversion module, where $2 \leq B \leq N-1$, C and D are B+1 or B−1, when C is B+1, then D is B−1, when C is B−1, then D is B+1 and E is B+2 or B−2, and A, B, C, D and E are positive integers; one output of the first switch module of the N-th stage is connected to the N-th polarity conversion module. The other output end is connected to one output end of one of the first switch modules of the (N−1)-th stage, and the output end of the first switch of the first switch module of the (N−1)-th stage is connected to the (N−1)-th polarity conversion module.

In a specific embodiment, the second switch module of the first stage and the second switch module of the N-th stage respectively include a third switch, the second switch module of the second stage to the second switch module of the (N−1)-th stage respectively includes two third switches and one fourth switch. Wherein, in the second switch module of the first stage, the first input end and the second input end of the third switch are respectively connected to the two polarity conversion modules having different polarity conversion functions, and the output end thereof outputs a second polarity conversion signal; in the second switch module of the M-th stage, the first input end and the second input end of the third switch are respectively connected to the two polarity conversion modules having different polarity conversion functions, and the output end thereof is connected to the input end of the fourth switch, the output end of the fourth switch outputs a second polarity switching signal; in the second switch module of the N-th stage, the first input end and the second input end of the third switch are respectively connected to the two polarity conversion modules having different polarity conversion functions, and the output end outputs a second polarity conversion signal.

Specifically, in the second switch module of the first stage, the first input end of the third switch is connected to the polarity conversion module of the first stage, the second input end is connected to the polarity conversion module of the second stage, and the output end outputs a second polarity conversion signal; in the second switch module of the M-th stage, the first input end of the third switch is respectively connected to the polarity conversion module of the upper stage and the next stage, the second input end of the third switch is respectively connected to the polarity conversion module of the current stage and the polarity conversion module of the lower/upper stage, an output end of the third switch is connected to an input end of the fourth switch, and an output end of the fourth switch outputs a second polarity switching signal; in the second switch module of the N-th stage, the first input end of the third switch is connected to the polarity conversion module of the N-th stage, the second input end is connected to the polarity conversion module of the (N−1)-th stage, and the output end outputs a second polarity conversion signal.

Further, the second switch unit includes an N-th stage second switch module, the first stage second switch module and the N-th second switch module respectively include one third switch, the second switch module of the second stage to the second switch module of the (N−1)-th stage respectively include two third switches and one fourth switch. Wherein, one input end of the third switch of the first stage second switch module is connected to the first stage polarity conversion module, the other input terminal is connected to one input terminal of one of the second switch modules of the second stage, the input end of the third switch of the second stage second switch module is further connected to the second stage polarity conversion module, and the output end of the third switch of the first stage second switch module outputs a second polarity switching signal; one input of one third switch of the second switch module of the B-th stage is connected to the B-th polarity conversion module, the other input of the third switch of the second switch module of the B-th stage is connected to one input of one of the second switch modules of the C-th stage, and the input end of the third switch of the C-th stage second switch module is further connected to the C-th polarity switching module; one input of the other third switch of the second switch module of the B-th stage is connected to one input of one of the third switch modules of the D-th stage, the other input of the third switch of the second switch module of the B-th stage is connected to one input of one of the third switch modules of the second stage, and the input end of the third switch of the second switch module of the E-th stage is connected to the E stage polarity conversion module; an output end of one of the second switch modules of the B-th stage is connected to one input of the fourth switch of the second switch module of the B-th stage, the output of the other one of the second switch modules of the B-th stage is connected to the other input of the fourth switch of the second switch module of the B-th stage, an output end of the fourth switch of the second switch module of the B-th stage outputs a B-th second polarity switching signal; one input of the third switch of the second switch module of the N-th stage is connected to the N-th stage polarity conversion module, the other input terminal is connected to one input terminal of one of the second switch modules of the (N−1)-th stage, and the input end of the third switch of the second switch module of the (N−1)-th stage is connected to the (N−1)-th polarity conversion module, the output of the third switch of the N-th stage second switch module outputs an N-th stage second polarity switching signal.

The embodiment of the present invention may connect an input end of a switch of the same form as the first switch at each output end of the first switch of the first switch module to the N-th first switch module of the first stage. Similarly, an input of a switch of the same form as the first switch can be connected at each output of the switches. Similarly, each input end of the third switch of the second switch module of the first stage to the second switch module of the N-th stage is connected to the output end of a switch of the same form as the third switch. Similarly, the output terminal of a switch of the same form as the third switch can be connected to each input end of the switches, thereby implementing the structure of the source driving circuit of the embodiment of the present invention. It will be apparent to those skilled in the art that various modifications can be readily made to these embodiments and the general principles described herein can be applied to other embodiments without the inventive work. Therefore, the present invention is not limited to the embodiments described above, and those skilled in the art should be able to make modifications and changes within the scope of the invention without departing from the scope of the invention.

Further, please refer to FIG. 12, the embodiment provides a source driving circuit, and the source driving circuit includes four source drivers. The first switch module of the first stage includes a first switch SW1. The second stage first switch module includes one second switch SW2, one first switch SW3 and one first switch SW4. The third stage first switch module includes one second switch SW5, one first switch SW6 and one first switch SW7. The first stage switch module of the fourth stage includes a first switch SW8. The first stage second switch module includes a third switch SW9. The second stage second switch module includes one fourth switch SW10, one third switch SW11 and one third switch SW12. The third stage second switch module includes one fourth switch SW13, one third switch SW14 and one third switch SW15. The fourth stage second switch module includes a third switch SW16. Wherein, the input end of each first switch module (i.e., the Q1 end of the first switch SW1, the Q1 end of the second switch SW2, the Q1 end of the second switch SW5, and the Q1 end of the first switch SW8) is used to receive the sub polarity digital signal according to the set interval. The Q2 end of the first switch SW1 is correspondingly connected to the first stage data latch. The first stage level shifter, the first stage polarity conversion module (positive polarity conversion module), and the first stage output buffer are sequentially connected to the Q1 end of the first stage data latch and the third switch SW9. The Q3 end of the first switch SW1 is connected to the Q3 end of the first switch SW3, and the Q2 end of the second switch SW2 is connected to the Q1 end of the first switch SW3. The Q3 end of the second switch SW2 is connected to the Q1 end of the first switch SW4, and the Q2 end of the first switch SW3 is connected to the Q2 end of the first switch SW1. The Q3 end of the first switch SW3 is also connected to the second stage data latch. The second stage level shifter, the second stage polarity conversion module (negative polarity conversion module), and the second stage output buffer are sequentially connected to the Q2 end of the second stage data latch and the third switch SW11. The Q2 end of the first switch SW4 is connected to the Q2 end of the first switch SW7. The Q3 end of the first switch SW4 is connected to the Q3 end of the first switch SW8. The Q2 end of the second switch SW5 is connected to the Q1 end of the first switch SW6. The Q3 end of the second switch SW5 is connected to the Q1 end of the first switch SW7. The Q2 end of the first switch SW6 is connected to the Q2 end of the first switch SW1. The Q3 end of the first switch SW6 is connected to the Q3 end of the first switch SW3. The Q2 end of the first switch SW7 is also connected to the third stage data latch. The third stage level shifter, the third level polarity conversion module (positive polarity conversion module), and the third stage output buffer are sequentially connected to the Q1 end of the third stage data latch and the third switch SW15. The Q3 end of the first switch SW7 is connected to the Q3 end of the first switch SW8. The Q2 end of the first switch SW8 is connected to the Q2 end of the first switch SW7. The Q3 end of the first switch SW8 is also connected to the fourth stage data latch. The fourth stage level shifter, the fourth stage polarity conversion module (negative polarity conversion module), and the fourth stage output buffer are sequentially connected to the Q2 terminal of the fourth stage data latch and the third switch SW16. The Q2 end of the third switch SW9 is connected to the Q2 end of the third switch SW11. The Q3 end of the third switch SW9 transmits its corresponding sub polarity conversion signal to its corresponding pixel position according to the sub polarity digital signal obtained by the first stage first switch module, to control the polarity of the pixel position. The Q1 end of the third switch SW11 is connected to the Q1 end of the third switch SW9. The Q3 end of the third switch SW11 is connected to the Q1 end of the fourth switch SW10. The Q1 end of the third switch SW12 is connected to the Q1 end of the third switch SW15. The Q2 end of the third switch SW12 is connected to the Q2 end of the third switch SW16. The Q3 end of the third switch SW12 is connected to the Q2 end of the fourth switch SW10. The Q3 end of the fourth switch SW10 transmits its corresponding sub polarity conversion signal to its corresponding pixel position according to the sub polarity digital signal obtained by the second stage first switching module, to control the polarity of the pixel position. The Q1 end of the third switch SW14 is connected to the Q1 end of the third switch SW9. The Q2 end of the third switch SW14 is connected to the Q2 end of the third switch SW11. The Q3 end of the third switch SW14 is connected to the Q1 end of the fourth switch SW13. The Q2 end of the third switch SW15 is connected to the Q2 end of the third switch SW16. The Q3 end of the third switch SW15 is connected to the Q2 end of the fourth switch SW13. The Q3 end of the fourth switch SW13 transmits its corresponding sub polarity conversion signal to its corresponding pixel position according to the sub polarity digital signal obtained by the third stage first switching module, to control the polarity of the pixel position. The Q1 end of the third switch SW16 is connected to the Q1 end of the third switch SW15. The Q3 end of the third switch SW16 transmits its corresponding sub polarity conversion signal to its corresponding pixel position according to the sub polarity digital signal obtained by the first stage first switching module of the fourth stage to control the polarity of the pixel position.

For example, see FIG. 10 and FIG. 12, taking the first row of sub-pixels in FIG. 10 as an example, transmitting the first polarity digital signal corresponding to the first row of sub-pixels to the first switching unit, transmitting the first sub polarity digital signal of the first polarity digital signal of the row to the first stage first switching module, transmitting the second sub polarity digital signal of the first polarity digital signal of the row to the second stage second switching module, transmitting the third sub polarity digital signal of the first polarity digital signal of the row to the third stage third switch module, and transmitting the fourth sub polarity digital signal of the first polarity digital signal of the row to the fourth stage fourth switch module. The polarity required for the first sub polarity digital signal is P, the polarity required for the second sub polarity digital signal is N, the polarity required for the third sub polarity digital signal is N, and the polarity required for the fourth sub polarity digital signal is P. The Q1 end of the first switch SW1 is connected to the Q2 end of the first switch SW1. The Q1 end of the second switch SW2 is connected to the Q2 end of the second switch SW2. The Q1 end of the first switch SW3 is connected to the Q3 end of the first switch SW3. The Q1 end of the first switch SW4 is connected to the Q2 end of the first switch SW4. The Q1 end of the second switch SW5 is connected to the Q3 end of the second switch SW5. The Q1 end of the first switch SW6 is connected to the Q3 end of the first switch SW6. The Q1 end of the first switch SW7 is connected to the Q3 end of a switch SW7. The Q1 end of the first switch SW8 is connected to the Q2 end of the first switch SW8. The Q1 end of the third switch SW9 is connected to the Q3 end of the third switch SW9. The Q1 end of the fourth switch SW10 is connected to the Q3 end of the fourth switch SW10. The Q2 end of the third switch SW11 is connected to the Q3 end of the third switch SW11. The Q1 end of the third switch SW12 is connected to the Q3 end of the third switch SW12. The Q2 end of the fourth switch SW13 is connected to the Q3 end of the fourth switch SW13. The Q2 end of the third switch SW14 is connected to the Q3 end of the third switch SW14. The Q2 end of the third switch SW15 is connected to the Q3 end of the third switch SW15. The Q1 end of the third switch SW16 is connected to the Q3 end of the third switch SW16. By arranging the switches inside the source driving circuit in the above manner, the arrangement of the PNNPs can be realized. For example, the fifth row of sub-pixels in FIG. 10 will be described as an example, transmitting the first polarity digital signal corresponding to the fifth row of sub-pixels to the first switching unit, transmitting the first sub polarity digital signal of the first polarity digital signal of the row to the first stage first switching module, transmitting the second sub polarity digital signal of the first polarity digital signal of the row to the second stage first switching module, transmitting the third sub polarity digital signal of the first polarity digital signal of the row to the third stage third switch module, and transmitting the fourth sub polarity digital signal of the first polarity digital signal of the row to the fourth stage first switching module. The polarity required for the first sub polarity digital signal is P, the polarity required for the second sub polarity digital signal is P, the polarity required for the third sub polarity digital signal is N, and the polarity required for the fourth sub polarity digital signal is N. The Q1 end of the first switch SW1 is connected to the Q2 end of the first switch SW1. The Q1 end of the second switch SW2 is connected to the Q3 end of the second switch SW2. The Q1 end of the first switch SW3 is connected to the Q3 end of the first switch SW3. The Q1 end of the first switch SW4 is connected to the Q2 end of the first switch SW4. The Q1 end of the second switch SW5 is connected to the Q2 end of the second switch SW5. The Q1 end of the first switch SW6 is connected to the Q3 end of the first switch SW6. The Q1 end of the first switch SW7 is connected to the Q2 end of a switch SW7. The Q1 end of the first switch SW8 is connected to the Q3 end of the first switch SW8. The Q1 end of the third switch SW9 is connected to the Q3 end of the third switch SW9. The Q2 end of the fourth switch SW10 is connected to the Q3 end of the fourth switch SW10. The Q2 end of the third switch SW11 is connected to the Q3 end of the third switch SW11. The Q1 end of the third switch SW12 is connected to the Q3 end of the third switch SW12. The Q1 end of the fourth switch SW13 is connected to the Q3 end of the fourth switch SW13. The Q2 end of the third switch SW14 is connected to the Q3 end of the third switch SW14. The Q1 end of the third switch SW15 is connected to the Q3 end of the third switch SW15. The Q2 end of the third switch SW16 is connected to the Q3 end of the third switch SW16. By connecting the switches inside the source drive circuit in the above manner, the arrangement of PNNPs can be realized, and so on. PPNN, NNPP, PNNP, NPPN, PNPN, and NPNP can be realized by the source driving circuit of this embodiment. Therefore, the source driving circuit of the embodiment is applicable not only to the conventional polarity inversion mode but also to the interleaved polarity inversion mode. Further, the phenomenon of horizontal equidistant horizontal stripes of the display panel is reduced, and the temperature at which the driving chip operates can also be reduced.

It should be understood that one output of all the first switch and the second switch of the present invention is the first output end, and the other output end is the second output end. That is, when the first output of the first switch and the second switch is Q2, the second output is Q3, when the first output of the first switch and the second switch is Q3, the second output is Q2. Similarly, all the input terminals of all the third switch and the fourth switch of the present invention are the first input end, and the other input end is the second input end. That is, when the first input of the third switch and the fourth switch is Q1, the second input is Q2, when the first input of the third switch and the fourth switch is Q2, then the second input is Q1.

Figure 13:
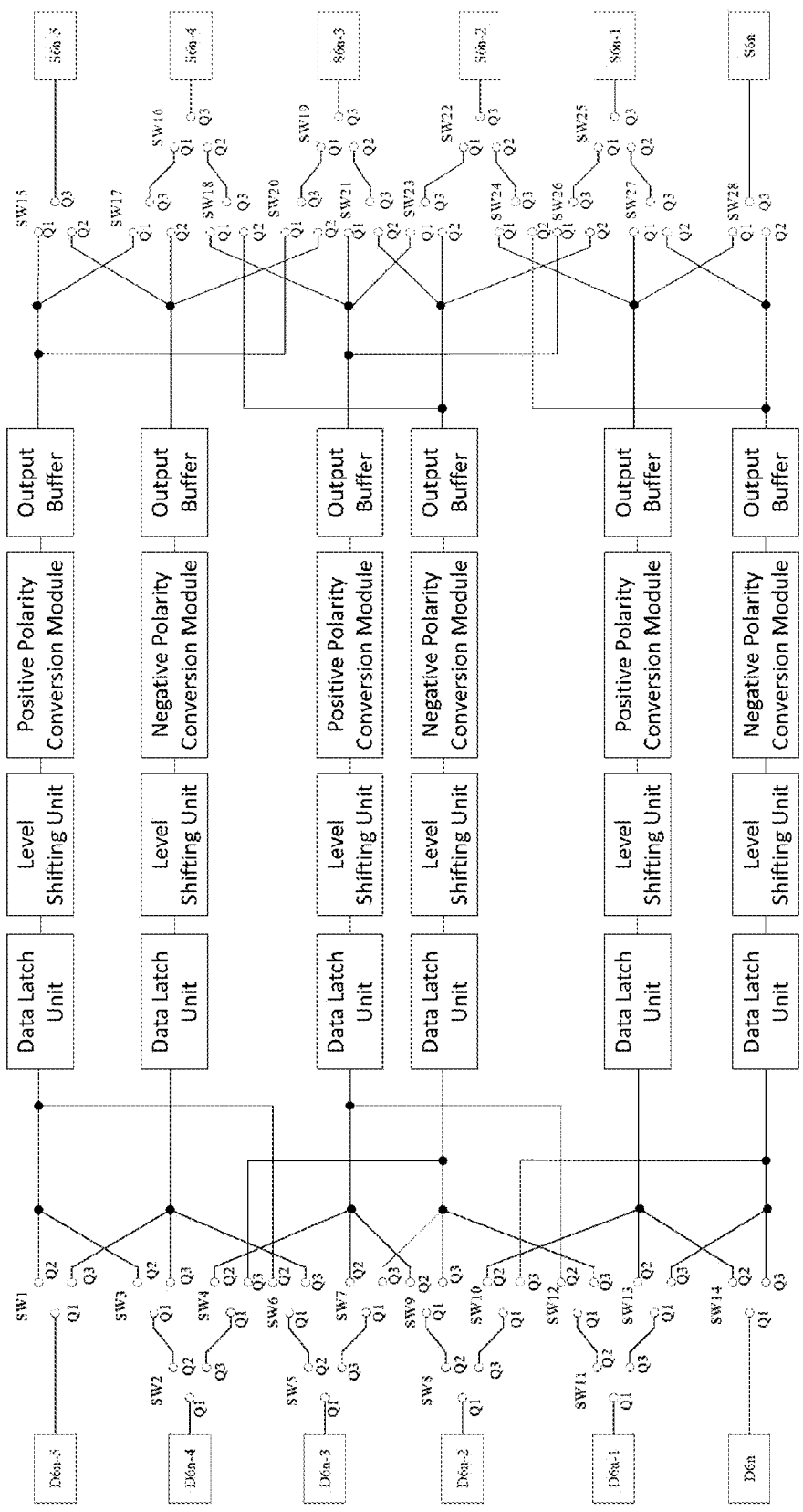
FIG. 13 is a schematic diagram of still another source driving circuit according to an embodiment of the present invention.

Further, referring to FIG. 13, the embodiment provides a source driving circuit, where the source driving circuit includes six source drivers. The first switch module of the first stage includes a first switch SW1. The second stage first switch module includes one second switch SW2, one first switch SW3 and one first switch SW4. The third stage first switch module includes one second switch SW5, one first switch SW6 and one first switch SW7. The fourth stage first switch module includes one second switch SW8, one first switch SW9 and one first switch SW10. The fifth stage first switch module includes one second switch SW11, one first switch SW12 and one first switch SW13, the sixth stage first switch module includes a first switch SW16, the first stage second switch module includes a third switch SW15, the second stage second switch module includes a fourth switch SW16, a third switch SW17 and a third switch SW18. The third stage second switch module includes a fourth switch SW19, a third switch SW20, and a third switch SW21. The fourth stage second switch module includes one fourth switch SW22, one third switch SW23 and one third switch SW24. The fifth stage second switch module includes one fourth switch SW25, one third switch SW26 and one third switch SW27. The sixth stage second switch module includes a third switch SW28. Wherein, the input end of the first switch module of each stage (i.e., the Q1 end of the first switch SW1, the Q1 end of the second switch SW2, the Q1 end of the second switch SW5, the Q1 end of the second switch SW8, the Q1 end of the second switch SW11, and the Q1 end of the first switch SW14) is used to receive the sub polarity digital signal according to the set interval. The Q2 end of the first switch SW1 is correspondingly connected to the first stage data latch. The first stage level shifter, the first stage polarity conversion module (positive polarity conversion module), and the first stage output buffer are sequentially connected to the Q1 end of the first stage data latch and the third switch SW15. The Q3 end of the first switch SW1 is connected to the Q3 end of the first switch SW3. The Q2 end of the second switch SW2 is connected to the Q1 end of the first switch SW3. The Q3 end of the second switch SW2 is connected to the Q1 end of the first switch SW4. The Q2 end of the first switch SW3 is connected to the Q2 end of the first switch SW1. The Q3 end of the first switch SW3 is also connected to the second stage data latch. The second stage level shifter, the second stage polarity conversion module (negative polarity conversion module), and the second stage output buffer are sequentially connected to the Q2 end of the second stage data latch and the third switch SW17. The Q2 end of the first switch SW4 is connected to the Q2 end of the first switch SW7. The Q3 end of the first switch SW4 is connected to the Q3 end of the first switch SW9. The Q2 end of the second switch SW5 is connected to the Q1 end of the first switch SW6. The Q3 end of the second switch SW5 is connected to the Q1 end of the first switch SW7. The Q2 end of the first switch SW6 is connected to the Q2 end of the first switch SW1. The Q3 end of the first switch SW6 is connected to the Q3 end of the first switch SW3. The Q2 end of the first switch SW7 is also connected to the third stage data latch. The third stage level shifter, the third stage polarity conversion module (positive polarity conversion module), and the third stage output buffer are sequentially connected to the Q1 end of the third stage data latch and the third switch SW21. The Q3 end of the first switch SW7 is connected to the Q3 end of the first switch SW9. The Q2 end of the second switch SW8 is connected to the Q1 end of the first switch SW9. The Q3 end of the second switch SW8 is connected to the Q1 end of the first switch SW10. The Q2 end of the first switch SW9 is connected to the Q2 end of the first switch SW7. The Q3 end of the first switch SW9 is also connected to the fourth stage data latch. The fourth stage level shifter, the fourth stage polarity conversion module (negative polarity conversion module), and the fourth stage output buffer are sequentially connected to the Q2 end of the fourth stage data latch and the third switch SW23. The Q2 end of the first switch SW10 is connected to the Q2 end of the first switch SW13. The Q3 end of the first switch SW10 is connected to the Q3 end of the first switch SW14. The Q2 end of the second switch SW11 is connected to the Q1 end of the first switch SW12. The Q3 end of the second switch SW11 is connected to the Q1 end of the first switch SW13. The Q2 end of the first switch SW12 is connected to the Q2 end of the first switch SW7. The Q3 end of the first switch SW12 is connected to the Q3 end of the first switch SW9. The Q2 end of the first switch SW13 is also connected to the fifth stage data latch. The fifth stage level shifter, the fifth stage polarity conversion module (positive polarity conversion module), and the fifth stage output buffer are sequentially connected to the Q1 end of the fifth stage data latch and the third switch SW27. The Q3 end of the first switch SW13 is connected to the Q3 end of the first switch SW14. The Q2 end of the first switch SW14 is connected to the Q2 end of the first switch SW13. The Q3 end of the first switch SW14 is also connected to the 6th stage data latch. The sixth stage level shifter, the sixth stage polarity conversion module (negative polarity conversion module), and the sixth stage output buffer are sequentially connected to the Q2 end of the sixth stage data latch and the third switch SW28. The Q2 end of the third switch SW15 is connected to the Q2 end of the third switch SW17. The Q3 end of the third switch SW15 transmits its corresponding sub polarity conversion signal to its corresponding pixel position according to the sub polarity digital signal obtained by the first stage first switch module, to control the polarity of the pixel position. The Q1 end of the third switch SW17 is connected to the Q1 end of the third switch SW15. The Q3 end of the third switch SW17 is connected to the Q1 end of the fourth switch SW16. The Q1 end of the third switch SW18 is connected to the Q1 end of the third switch SW21. The Q2 end of the third switch SW18 is connected to the Q2 end of the third switch SW23. The Q3 end of the third switch SW18 is connected to the Q2 end of the fourth switch SW16. The Q3 end of the fourth switch SW16 transmits its corresponding sub polarity conversion signal to its corresponding pixel position according to the sub polarity digital signal obtained by the second stage first switching module, to control the polarity of the pixel position. The Q1 end of the third switch SW20 is connected to the Q1 end of the third switch SW15. The Q2 end of the third switch SW20 is connected to the Q2 end of the third switch SW17. The Q3 end of the third switch SW20 is connected to the Q1 end of the fourth switch SW19. The Q2 end of the third switch SW21 is connected to the Q2 end of the third switch SW23. The Q3 end of the third switch SW21 is connected to the Q2 end of the fourth switch SW19. The Q3 end of the fourth switch SW19 transmits its corresponding sub polarity conversion signal to its corresponding pixel position according to the sub polarity digital signal obtained by the third stage first switching module, to control the polarity of the pixel position. The Q1 end of the third switch SW23 is connected to the Q1 end of the third switch SW21. The Q3 end of the third switch SW23 is connected to the Q1 end of the fourth switch SW22. The Q1 end of the third switch SW24 is connected to the Q1 end of the third switch SW27. The Q2 end of the third switch SW24 is connected to the Q2 end of the third switch SW28. The Q3 end of the third switch SW24 is connected to the Q2 end of the fourth switch SW22. The Q3 end of the fourth switch SW22 transmits its corresponding sub polarity conversion signal to its corresponding pixel position according to the sub polarity digital signal obtained by the first stage first switch module, to control the polarity of the pixel position. The Q1 end of the third switch SW26 is connected to the Q1 end of the third switch SW21. The Q2 end of the third switch SW26 is connected to the Q2 end of the third switch SW23. The Q3 end of the third switch SW26 is connected to the Q1 end of the fourth switch SW25. The Q2 end of the third switch SW27 is connected to the Q2 end of the third switch SW28. The Q3 end of the third switch SW27 is connected to the Q2 end of the fourth switch SW25. The Q3 end of the fourth switch SW25 transmits its corresponding sub polarity conversion signal to its corresponding pixel position according to the sub polarity digital signal obtained by the fifth stage first switching module, to control the polarity of the pixel position. The Q1 end of the third switch SW28 is connected to the Q1 end of the third switch SW27. The Q3 terminal of the third switch SW28 transmits its corresponding sub polarity conversion signal to its corresponding pixel position according to the sub polarity digital signal obtained by the sixth stage first switching module to control the polarity of the pixel position.

In the embodiment of the present invention, PPP . . . NNN . . . , NNN . . . PPP . . . can also be realized by increasing the number of source drivers. For example, if the number of source drivers is six, the polarity of the pixel unit can realize the arrangement of PPPNNN and NNNPPP.

For example, see FIG. 13, if the polarity of the first to third sub polarity digital signals of a row of sub-pixels is positive polarity, and the polarity of the fourth to sixth sub polarity digital signals is negative polarity, transmitting the first sub polarity digital signal to the first stage first switch module, transmitting the second sub polarity digital signal to the second stage first switch module, transmitting the third sub polarity digital signal to the third stage first switch module, transmitting the fourth sub polarity digital signal to the fourth stage first switch module, transmitting the fifth sub polarity digital signal to the fifth stage first switch module, and transmitting the sixth sub polarity digital signal to the sixth stage first switch module. The Q1 end of the first switch SW1 is connected to the Q2 end of the first switch SW1. The Q1 end of the second switch SW2 is connected to the Q3 end of the second switch SW2. The Q1 end of the first switch SW3 is connected to the Q3 end of the first switch SW3. The Q1 end of the first switch SW4 is connected to the Q2 end of the first switch SW4. The Q1 end of the second switch SW5 is connected to the Q3 end of the second switch SW5. The Q1 end of the first switch SW6 is connected to the Q3 end of the first switch SW6. The Q1 end of the first switch SW7 is connected to the Q2 end of a switch SW7. The Q1 end of the second switch SW8 is connected to the Q3 end of the second switch SW8. The Q1 end of the first switch SW9 is connected to the Q3 end of the first switch SW9. The Q1 end of the first switch SW10 is connected to the Q3 end of the first switch SW10. The Q1 end of the second switch SW11 is connected to the Q2 end of the second switch SW11. The Q1 end of the first switch SW12 is connected to the Q3 end of the first switch SW12. The Q1 end of the first switch SW13 is connected to the Q3 end of the first switch SW10. The Q1 end of the first switch SW14 is connected to the Q3 end of the first switch SW14. The Q1 end of the third switch SW15 is connected to the Q3 end of the third switch SW15. The Q2 end of the fourth switch SW16 is connected to the Q3 end of the fourth switch SW16. The Q2 end of the third switch SW17 is connected to the Q3 end of the third switch SW17. The Q1 end of the third switch SW18 is connected to the Q3 end of the third switch SW18. The Q2 end of the fourth switch SW19 is connected to the Q3 end of the fourth switch SW19. The Q2 end of the third switch SW20 is connected to the Q3 end of the third switch SW20. The Q1 end of the third switch SW21 is connected to the Q3 end of the third switch SW21. The Q2 end of the fourth switch SW22 is connected to the Q3 end of the fourth switch SW22. The Q2 end of the third switch SW23 is connected to the Q3 end of the third switch SW23. The Q2 end of the third switch SW24 is connected to the Q3 end of the third switch SW21. The Q1 end of the fourth switch SW25 is connected to the Q3 end of the fourth switch SW25. The Q2 end of the third switch SW26 is connected to the Q3 end of the third switch SW26. The Q2 end of the third switch SW27 is connected to the Q3 end of the third switch SW27. The Q2 end of the third switch SW28 is connected to the Q3 end of the third switch SW28. By connecting the switches inside the source drive circuit in the above manner, the arrangement of PPPNNN can be realized, and so on. The source driving circuit of the embodiment can realize the polarity arrangement manner of PNPNPN, NPNPNP, etc., so that the source driving circuit of the embodiment is not only applicable to the conventional polarity inversion mode. It can also be applied to the interleaved polarity inversion method, thereby reducing the horizontal equidistant horizontal stripes of the display panel, and also reducing the temperature at which the driving chip operates.

In a specific embodiment, a data latch unit and a level shifting unit are further included. The data latch unit is configured to store the second polarity digital signal. The level shifting unit is configured to level convert the second polarity digital signal. The data latch unit includes N data latches. The level shifting unit includes N level shifters. The P-th stage data latch and the P-th stage level converter are sequentially connected between the P-th stage switching module and the P-th stage polarity conversion module, wherein P is a positive integer and $1 \leqslant P \leqslant N$.

In a specific embodiment, the method further includes an output buffer unit, configured to buffer the first polarity switching signal, the output buffer unit includes N output buffers, and the q-th stage output buffer is connected between the q-th stage polarity conversion module and the q-th stage second switch module, where q is a positive integer and $1 \leqslant q \leqslant N$.

In the embodiment of the present invention, the position of the first polarity digital signal is rearranged by the first switching unit to obtain the second polarity digital signal. Performing polarity switching on the second polarity digital signal after the position rearrangement by the polarity conversion unit, thereby obtaining the first polarity switching signal. Recovering the position of the first polarity switching signal by using the second switching unit, so that the output driving signal is output to a corresponding position of the display panel. Therefore, the source driving circuit is applicable not only to the conventional polarity inversion method but also to the interleaved polarity inversion method. Further, the phenomenon of horizontal equidistant horizontal stripes of the display panel is reduced, and the temperature at which the driving chip operates can also be reduced.

The embodiment of the invention further provides a source driving method, the method including:

receiving a first polarity digital signal, rearranging each polarity position of the first polarity digital signal according to a preset rule according to a polarity of each polarity position in the first polarity digital signal, and obtaining a second polarity digital signal;

performing polarity conversion on the second polarity digital signal, and obtaining a first polarity switching signal; and performing position recovery on the first polarity switching signal according to a polarity of each polarity position in the first polarity digital signal, and obtaining a second polarity switching signal.

The method of the embodiment of the invention is applicable not only to the traditional polarity inversion mode but also to the interleaved polarity inversion mode. Further, the phenomenon of horizontal equidistant horizontal stripes of the display panel is reduced, and the temperature at which the driving chip operates can also be reduced.

The embodiment of the invention further provides a liquid crystal display including the above-mentioned source driving circuit, so that the horizontal equidistant horizontal stripes of the liquid crystal display can also reduce the temperature during operation of the driving chip.

Embodiment 7

Figure 14:
FIG. 14 is a schematic structural diagram of a pixel matrix driving apparatus according to an embodiment of the present invention.

Referring to FIG. 14, FIG. 14 is a schematic structural diagram of a pixel matrix driving apparatus according to an embodiment of the present invention. The pixel matrix driving device of this embodiment is applicable to a liquid crystal display device, and includes:

a timing controller, configured to receive a first polarity digital signal, and rearrange a polarity position corresponding to the first polarity digital signal to obtain a second polarity digital signal; and a source driving circuit, configured to perform polarity switching and position recovery on the second polarity digital signal to obtain a first polarity switching signal.

In the embodiment of the present invention, the position rearrangement of the first polarity digital signal is implemented by the timing controller to obtain the second polarity digital signal. And performing polarity switching and position recovery on the second polarity digital signal after the position rearrangement through the source driving circuit to obtain the first polarity switching signal, outputting the output first polarity switching signal to a corresponding position of the display panel, so that the pixel matrix driving device is not only suitable for the conventional polarity inversion mode. It can also be applied to the interleaved polarity inversion method, thereby reducing the horizontal equidistant horizontal stripes of the display panel, and also reducing the temperature at which the driving chip operates.

The pixel matrix driving device of the embodiment of the invention is applicable not only to the dot inversion driving method, column inversion driving method, line inversion driving method, 1+2 line inversion driving method and the N Line inversion driving method, but also to the interleaved polarity inversion method. The interleaved polarity inversion method means that there are S different polarity inversion positions between the i-th column sub-pixel of the pixel matrix and the [i+(U−1)]-th column sub-pixel, where U is the polarity inversion repetition period in the direction of the scan line. Specifically, the liquid crystal display panel includes a plurality of columns of data lines parallel to each other and a plurality of rows of scan lines parallel to each other. The plurality of columns of the data lines and the plurality of rows of the scan lines are vertically intersected with each other, and the plurality of columns of the data lines and the plurality of rows of the scan lines intersect to form a matrix of X rows and Y columns arranged in a matrix, and X and Y are positive integers, wherein there are S different polarity inversion positions between the i-th column sub-pixel and the [i+(U−1)]-th column sub-pixel, where 0<i<Y, U≥4, S≥2.

Specifically, the polarity inversion position refers to a position where the polarity changes in any one of the columns of sub-pixels. When the first sub-pixel to the a-th sub-pixel of the i-th sub-pixel are all positive polarity, and the (a+1)-th sub-pixel is negative polarity, the (a+1)-th sub-pixel is a position where the polarity changes. Each column of sub-pixels is correspondingly connected to one data line, and each row of sub-pixels is correspondingly connected to one scan line. The data line is used to provide a data signal for a corresponding column of pixel units, and the scan line is used to provide a scan signal for a corresponding row of pixel units.

For example, referring again to FIG. 10, the pixel matrix includes 16 rows and 16 columns of sub-pixels. The polarity inversion position of the first column sub-pixel D1 occurs at the pixel position of the ninth row sub-pixel G9. The polarity inversion position of the second column sub-pixel D2 occurs at the pixel position of the fifth row sub-pixel G5 and the pixel position of the thirteenth row sub-pixel G15, the polarity inversion position of the third column sub-pixel D3 occurs in the ninth row sub-pixel G9, and so on, which is an interleaved polarity inversion method.

The interleaved polarity inversion method can reduce the horizontal equidistant horizontal stripes by assigning the polarity conversion position to different pixel positions, and improve the display quality of the liquid crystal display panel. At the same time, the power consumption and temperature generated by the driving can be reduced, the display quality of the liquid crystal display panel can be improved, and the service life of the liquid crystal display panel can be improved.

Referring again to FIG. 11, the implementation of the interleave polarity inversion method for performing polarity inversion every 8 rows is required to output a driving signal as shown in FIG. 11. That is, the combination A (the polarity of the sub-pixels is PPNN), the combination B (the polarity of the sub-pixels is NNPP), the combination C (the polarity of the sub-pixels is PNNP), the combination D (the polarity of the sub-pixels is NPPN), the combination E (the polarity of the sub-pixels is PNPN), the combination F (the polarity of the sub-pixels is NPNP) in FIG. 11 can be output. At present, the driving circuit for the source driver can only realize the combination of the four polarity outputs of the combination C to the combination F, but the combination of the two polarity outputs of the combination A and the combination B cannot be realized. Therefore, the current driving device is not suitable for the interleaved polarity inversion method.

In a specific embodiment, the timing controller is configured to receive the first polarity digital signal, and rearrange the polarity positions corresponding to the first polarity digital signal to obtain the second polarity digital signal.

In a specific embodiment, the first switching unit is configured to receive the first polarity digital signal, and rearrange each polarity position of the first polarity digital signal according to a polarity of each polarity position in the first polarity digital signal to obtain a second polarity digital signal.

Specifically, the timing controller includes a plurality of storage units, each storage unit includes N storages, and the first polarity digital signal includes a plurality of sub polarity digital signals. Each of the memories is configured to receive one sub polarity digital signal according to a preset rule. The polarity of each sub-pixel corresponding to the first polarity digital signal represents a sub polarity digital signal, that is, the sub polarity digital signal reflects the polarity of its corresponding sub-pixel.

Further, when the timing controller receives the first polarity digital signal, each sub polarity digital signal is correspondingly transmitted to a memory according to a preset rule. That is, when the timing controller receives the first polarity digital signal, correspondingly transmitting the same number of sub polarity digital signals to each storage unit according to the number of memories in each storage unit and the order of the first polarity digital signals in the pixel matrix. And each memory receives one sub polarity digital signal according to a preset rule. Wherein, when each storage unit includes m storages, the storage unit correspondingly receives m storages according to the order of the first polarity digital signals in the pixel matrix. The preset rule is that when a certain m sub polarity digital signals are transmitted to a certain storage unit; the sub polarity digital signals are transmitted according to the polarity of each sub polarity digital signal to a certain memory corresponding to the polarity of the storage unit. That is, if the polarity of the sub polarity digital signal is positive polarity, a certain polarity conversion module corresponding to a certain memory transmitted by the sub polarity digital signal is also a positive polarity conversion module. If the polarity of the sub polarity digital signal is negative polarity, a certain polarity conversion module corresponding to a certain memory transmitted by the sub polarity digital signal is also a negative polarity conversion module. And when a sub polarity digital signal is transmitted to a certain storage of a storage unit, the remaining sub polarity digital signals transmitted to the storage unit can no longer be transmitted to the storage, and the sub polarity digital signals rearranged according to the preset rule are the second-polar digital signals.

Further, each storage unit of each storage unit transmits its received sub polarity digital signal correspondingly to the polarity conversion module, and the number of storages in each storage unit is equal to the polarity conversion module in the source driving circuit. If there are N polarity conversion modules, the number of the storage units in each storage unit is also N, and the storage unit in each storage unit sequentially transmits the sub polarity digital signals to the polarity conversion module. That is, the M-th level memory in the storage unit transmits the sub polarity digital signal it receives to the M-th level polarity conversion module (the M-th level is the M-th).

In a specific embodiment, the source driving circuit includes a polarity switching unit and a switch recovery unit, and the source driving circuit includes an N level source driver. That is, the source driving circuit includes N source drivers, and each source driver includes one polarity conversion module and one switch recovery module. Wherein each source driver receives a number of rows of second polarity digital signals transmitted by a TCON (Timing Controller).

The polarity conversion unit is configured to perform polarity conversion on the second polarity digital signal to obtain a second polarity conversion signal.

Specifically, the polarity conversion unit is configured to perform polarity conversion on the sub polarity digital signal that is rearranged by the timing controller, and transmit the sub polarity digital signal received by the storage unit to the switch recovery module. If the polarity conversion module corresponding to the switch recovery module is a negative polarity conversion module, the polarity of the analog signal output by the sub polarity digital signal through the polarity conversion module is negative polarity. If the polarity conversion module corresponding to the switch recovery module is a positive polarity conversion module, the polarity of the analog signal output by the sub polarity digital signal through the polarity conversion module is positive polarity. All sub polarity digital signals after polarity conversion are the second polarity switching signals, and the second polarity switching signals are analog signals.

Further, the polarity conversion unit includes N polarity conversion modules, and the polarity conversion module includes a positive polarity conversion module and a negative polarity conversion module; wherein, when the polarity conversion module of the K-th stage is a positive polarity conversion module, the polarity conversion module of the (K+1)-th stage is a negative polarity conversion module, where N and K are both positive integers, and $1 \leq K \leq N$.

Figure 16:
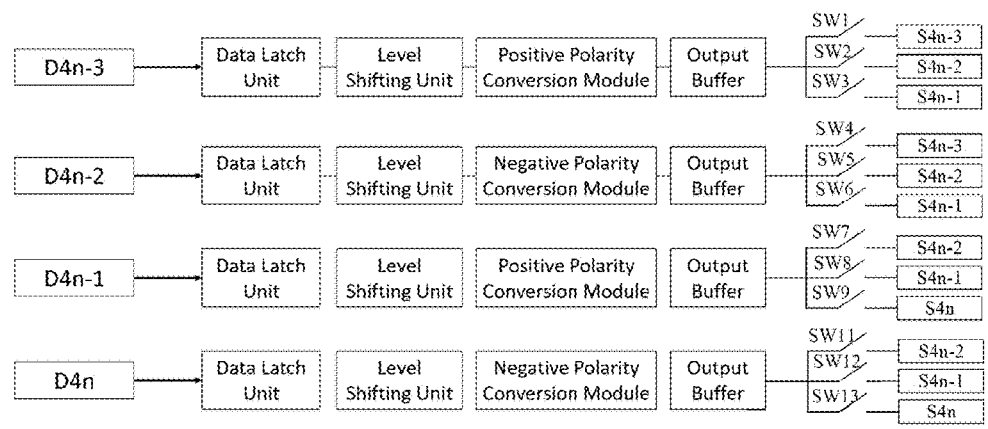
FIG. 16 is a schematic diagram of a source driving circuit according to an embodiment of the present invention.

For example, see FIG. 16, the first stage polarity conversion module is a positive polarity conversion module. The second stage polarity conversion module is a negative polarity conversion module. The third stage polarity conversion module is a positive polarity conversion module. The fourth stage polarity conversion module has a negative polarity conversion module.

The switch recovery unit is configured to perform position recovery on the second polarity switching signal according to the position of the first polarity digital signal to obtain a first polarity switching signal.

Specifically, the switch recovery unit includes N switch recovery modules, and the second polarity switching signal includes a plurality of sub polarity conversion signals, the switch recovery module is configured to perform position recovery on the sub polarity conversion signal according to a position of the first polarity digital signal.

Further, the switch recovery module of the K-th stage includes a plurality of switches, the input end of the switch is connected to the polarity conversion module of the K-th stage, and the output end of the switch is used for controlling the polarity of different first polarity digital signals. That is, the obtained sub polarity conversion signal is restored by a switch to a position in a pixel matrix in which its corresponding sub polarity digital signal is located.

The first polarity switching signal is a position recovery of the second polarity switching signal after the position rearrangement by the timing controller is performed by the switch recovery unit. For example, if the sub polarity digital signal received by the first stage memory of the first level memory unit is transmitted to the second stage polarity conversion module, the sub polarity conversion signal corresponding to the sub polarity digital signal is restored to the original pixel position by the second stage switch recovery unit. That is, the switch in the second stage switch recovery unit is controlled to control the polarity of the position of the sub polarity digital signal, so that the second stage switch recovery unit block correctly controls the polarity of its corresponding pixel position.

Further, the K-th stage switch recovery module includes p switches, wherein an output end of one switch is connected to a polarity of a pixel matrix position where the sub polarity digital signal controlled by the source driver of the current stage is located, the outputs of the remaining switches can be connected to different source drivers in addition to the source drivers of this stage.

Preferably, each switch recovery module includes 3 switches, in the first stage switch recovery module, the output end of one of the switches is connected to the polarity of the pixel matrix position where the sub polarity digital signal controlled by the source driver of the current stage is located. The output of the other switch is connected to the polarity of the pixel matrix position where the sub polarity digital signal controlled by the next level source driver is located. The third switch is connected to the polarity of the pixel matrix position where the sub polarity digital signal controlled by the next two level source driver is located. In the M-th stage switch recovery module, the output of one of the switches is connected to the polarity of the pixel matrix position where the sub polarity digital signal controlled by the source driver of the current stage is located. The output of the other switch is connected to the polarity of the pixel matrix position where the sub polarity digital signal controlled by the previous source driver is located. The output of the third switch is connected to the polarity of the pixel matrix position where the sub polarity digital signal controlled by the next level source driver is located. In the N-th stage switch recovery module, the output of one of the switches is connected to the polarity of the pixel matrix position where the sub polarity digital signal controlled by the source driver of the current stage is located, the output of the other switch is connected to the polarity of the pixel matrix position where the sub polarity digital signal controlled by the previous source driver is located, the third switch is connected to the polarity of the pixel matrix position of the sub polarity digital signal controlled by the upper two level source driver. This design can save chip area and increase operating speed, where 1<M<N.

The number of switches of each switch recovery module in the embodiment of the present invention may also be other, for example, may be transformed according to the polarity setting characteristics of each pixel matrix, to achieve position rearrangement and position recovery of the sub polarity digital signals, it will be apparent to those skilled in the art that various modifications can be readily made to these embodiments and the general principles described herein can be applied to other embodiments without the inventive work. Therefore, the present invention is not limited to the embodiments described above, and those skilled in the art should be able to make modifications and changes within the scope of the invention without departing from the scope of the invention.

For example, please refer to FIG. 16, which shows a specific source driving circuit. Wherein, each switch recovery module includes three switches, the first stage polarity conversion module (positive polarity conversion module) is connected to the first stage storage unit in each level of the storage unit, the output of the first stage polarity conversion module is connected to three switches in the first stage switch recovery module. The output of the first switch SW1 is connected to the polarity of the pixel matrix position where the sub polarity digital signal controlled by the first level source driver is located. The output of the second switch SW2 is connected to the polarity of the pixel matrix position where the sub polarity digital signal controlled by the second level source driver is located. The output of the third switch SW3 is connected to the polarity of the pixel matrix position where the sub polarity digital signal controlled by the third-level source driver is located. The second stage polarity conversion module (negative polarity conversion module) is connected to the second stage storage unit in each storage unit. The output of the second stage polarity conversion module is connected to three switches in the second stage switch recovery module. The output of the first switch SW4 is connected to the polarity of the pixel matrix position where the sub polarity digital signal controlled by the first stage source driver is located. The output of the second switch SW5 is connected to the polarity of the pixel matrix position where the sub polarity digital signal controlled by the second level source driver is located. The output of the third switch SW6 is connected to the polarity of the pixel matrix position where the sub polarity digital signal controlled by the third level source driver is located. The third stage polarity conversion module (positive polarity conversion module) is connected to the third stage storage unit in each storage unit. The output of the third stage polarity conversion module is connected to three switches in the third stage switch recovery module. The output of the first switch SW7 is connected to the polarity of the pixel matrix position where the sub polarity digital signal controlled by the second level source driver is located. The output of the second switch SW8 is connected to the polarity of the pixel matrix position where the sub polarity digital signal controlled by the third level source driver is located. The output of the third switch SW9 is connected to the polarity of the pixel matrix position where the sub polarity digital signal controlled by the fourth level source driver is located. The fourth stage polarity conversion module (negative polarity conversion module) is connected to the fourth stage storage unit in each storage unit. The output of the fourth stage polarity switching module is connected to the three switches in the fourth stage switch recovery module. The output of the first switch SW10 is connected to the polarity of the pixel matrix position where the sub polarity digital signal controlled by the second level source driver is located. The output of the second switch SW11 is connected to the polarity of the pixel matrix position where the sub polarity digital signal controlled by the third level source driver is located. The output of the third switch SW12 is connected to the polarity of the pixel matrix position where the sub polarity digital signal controlled by the fourth level source driver is located.

In a specific embodiment, the source driving circuit further includes a data latch unit and a level shifting unit. The data latch unit is configured to store the second polarity digital signal, the level shifting unit is configured to level convert the second polarity digital signal, the data latch unit includes N data latches, and the level shift unit includes N level shifters. The data latch of the K-th stage and the level shifter of the K-th stage are sequentially connected between the memory of the K-th stage and the polarity conversion module of the K-th stage.

In a specific embodiment, the source driving circuit further includes an output buffer unit, and the output buffer unit is configured to buffer the first polarity switching signal. The output buffer unit includes N output buffers, and the output buffer of the K-th stage is connected between the polarity conversion module of the K-th stage and the switch recovery module of the K-th stage.

Figure 15:
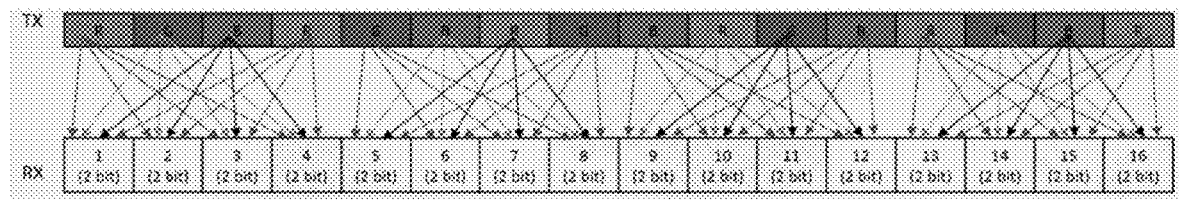
FIG. 15 is a schematic structural diagram of a timing controller according to an embodiment of the present invention.

In order to better understand the pixel matrix driving device of the present invention, the present embodiment will be described in one specific embodiment. Please also refer to FIG. 10, FIG. 15 and FIG. 16. As shown in FIG. 10, the polarity of the first polarity digital signal corresponding to the first row of sub-pixels of the pixel matrix is PNNPPN-NPPNNPPNNP, and the number of reservoirs in each storage unit is set to four, and the source driver circuit includes four source drivers. As shown in FIG. 17, the TX row corresponds to the first polarity digital signal transmitted to the timing controller, and the RX row corresponds to the second polarity digital signal that has been rearranged. Wherein each storage unit includes 4 storages, and each first polarity digital signal includes 16 sub polarity digital signals. That is, the storage 1, the storage 2, the storage 3 and the storage 4 constitute a first stage storage unit; the storage 5, the storage 6, the storage 7 and the storage 8 constitute a second stage storage unit; the storage 9, the storage 10, the storage 11 and the storage 12 constitute a third stage storage unit; and the storage 13, the storage 14, the storage 15 and the storage 16 constitute a fourth stage storage unit. The storage device 1, the storage device 5, the storage device 9, and the storage device 13 respectively transmit the sub polarity digital signals received by the storage device to the first stage polarity conversion module. The storage 2, the storage 6, the storage 10, and the storage 14 respectively transmit the sub polarity digital signals received by the storage device to the second stage polarity conversion module. The storage unit 3, the storage unit 7, the storage unit 11, and the storage unit 15 respectively transmit the sub polarity digital signals received by the storage unit to the third stage polarity conversion module. The storage 4, the storage 8, the storage 12, and the storage 16 respectively transmit the sub polarity digital signals received by the storage unit to the fourth stage polarity conversion module. Then each storage unit correspondingly receives 4 sub polarity digital signals, the first sub polarity digital signal to the fourth sub polarity digital signal are correspondingly transmitted to the first stage storage unit (the polarity of the first sub polarity digital signal to the fourth sub polarity digital signal is PNNP respectively), the fifth sub polarity digital signal to the eighth sub polarity digital signal are correspondingly transmitted to the second stage storage unit (the polarity of the fifth sub polarity digital signal to the eighth sub polarity digital signal are respectively PNNP), the ninth sub polarity digital signal to the twelfth sub polarity digital signal are correspondingly transmitted to the third stage storage unit (the polarity of the ninth sub polarity digital signal to the twelfth sub polarity digital signal is PNNP respectively), the thirteenth sub polarity digital signal to the sixteenth sub polarity digital signal are correspondingly transmitted to the fourth stage storage unit (the polarity of the thirteenth sub polarity digital signal to the sixteenth sub polarity digital signal are respectively PNNP). The polarity of the first sub polarity digital signal is P, and the first sub polarity digital signal can be transmitted to the memory 1. The polarity of the second sub polarity digital signal is N, and the second sub polarity digital signal can be transmitted to the memory 4. The polarity of the third sub polarity digital signal is N, and the third sub polarity digital signal can be transmitted to the memory 2. The polarity of the fourth sub polarity digital signal is P, and the fourth sub polarity digital signal can be transmitted to the memory 3. The polarity of the fifth sub polarity digital signal is P, and the fifth sub polarity digital signal can be transmitted to the memory 5. The polarity of the sixth sub polarity digital signal is N, and the sixth sub polarity digital signal can be transmitted to the memory 6. The polarity of the seventh sub polarity digital signal is N, and the seventh sub polarity digital signal can be transmitted to the memory 8. The polarity of the eighth sub polarity digital signal is P, and the eighth sub polarity digital signal can be transmitted to the memory 7. The polarity of the ninth sub polarity digital signal is P, and the ninth sub polarity digital signal can be transmitted to the memory 9. The polarity of the tenth sub polarity digital signal is N, and the tenth sub polarity digital signal can be transmitted to the memory 12. The polarity of the eleventh sub polarity digital signal is N, and the eleventh sub polarity digital signal can be transmitted to the memory 10. The polarity of the twelfth sub polarity digital signal is P, and the twelfth sub polarity digital signal can be transmitted to the memory 11. The polarity of the thirteenth sub polarity digital signal is P, and the thirteenth sub polarity digital signal can be transmitted to the memory 13. The polarity of the fourteenth sub polarity digital signal is N, and the fourteenth sub polarity digital signal can be transmitted to the memory 14. The polarity of the fifteenth sub polarity digital signal is N, and the fifteenth sub polarity digital signal can be transmitted to the memory 16. The polarity of the sixteenth sub polarity digital signal is P, and the sixteenth sub polarity digital signal can be transmitted to the memory 15. When the first sub polarity digital signal to the fourth sub polarity digital signal are transmitted to the source driving circuit, the switch SW1 is turned on, the switch SW6 is turned on, the switch SW9 is turned on, the switch SW11 is turned on, the switch SW2 is turned off, the switch SW3 is turned off, the switch SW4 is turned off, the switch SW5 is turned off, the switch SW7 is turned off, the switch SW8 is turned off, the switch SW10 is turned off, the switch SW12 is turned off, and the switch SW13 is turned off. When the fifth sub polarity digital signal to the eighth sub polarity digital signal are transmitted to the source driving circuit, the switch SW1 is turned on, the switch SW5 is turned on, the switch SW9 is turned on, the switch SW12 is turned on, the switch SW2 is turned off, the switch SW3 is turned off, the switch SW4 is turned off, the switch SW6 is turned off, the switch SW7 is turned off, the switch SW8 is turned off, the switch SW10 is turned off, the switch SW11 is turned off, and the switch SW13 is turned off. When the ninth sub polarity digital signal to the twelfth sub polarity digital signal is transmitted to the source driving circuit, the switch SW1 is turned on, the switch SW6 is turned on, the switch SW9 is turned on, the switch SW11 is turned on, the switch SW2 is turned off, the switch SW3 is turned off, the switch SW4 is turned off, the switch SW5 is turned off, the switch SW7 is turned off, the switch SW8 is turned off, the switch SW10 is turned off, the switch SW12 is turned off, and the switch SW13 is turned off. When the thirteenth sub polarity digital signal to the sixteenth sub polarity digital signal are transmitted to the source driving circuit, the switch SW1 is turned on, the switch SW5 is turned on, the switch SW9 is turned on, and the switch SW12 is turned on, the switch SW2 is turned off, the switch SW3 is turned off, the switch SW4 is turned off, the switch SW6 is turned off, the switch SW7 is turned off, the switch SW8 is turned off, the switch SW10 is turned off, the switch SW11 is turned off, and the switch SW13 is turned off. Similarly, the polarity of the first polarity digital signal corresponding to the fifth row of sub-pixels of the pixel matrix is PPNNPPNNPPNNPPNN. The polarity of the first sub polarity digital signal is P, and the first sub polarity digital signal can be transmitted to the memory 1. The polarity of the second sub polarity digital signal is P, and the second sub polarity digital signal can be transmitted to the memory 3. The polarity of the third sub polarity digital signal is N, and the third sub polarity digital signal can be transmitted to the memory 2. The polarity of the fourth sub polarity digital signal is N, and the fourth sub polarity digital signal can be transmitted to the memory 4. The polarity of the fifth sub polarity digital signal is P, and the fifth sub polarity digital signal can be transmitted to the memory 5. The polarity of the sixth sub polarity digital signal is P, and the sixth sub polarity digital signal can be transmitted to the memory 7. The polarity of the seventh sub polarity digital signal is N, and the seventh sub polarity digital signal can be transmitted to the memory 6. The polarity of the eighth sub polarity digital signal is N, and the eighth sub polarity digital signal can be transmitted to the memory 8. The polarity of the ninth sub polarity digital signal is P, and the ninth sub polarity digital signal can be transmitted to the memory 9. The polarity of the tenth sub polarity digital signal is P, and the tenth sub polarity digital signal can be transmitted to the memory 11. The polarity of the eleventh sub polarity digital signal is N, and the eleventh sub polarity digital signal can be transmitted to the memory 10. The polarity of the twelfth sub polarity digital signal is N, and the twelfth sub polarity digital signal can be transmitted to the memory 12. The polarity of the thirteenth sub polarity digital signal is P, and the thirteenth sub polarity digital signal can be transmitted to the memory 13. The polarity of the fourteenth sub polarity digital signal is P, and the fourteenth sub polarity digital signal can be transmitted to the memory 15. The polarity of the fifteenth sub polarity digital signal is N, and the fifteenth sub polarity digital signal can be transmitted to the memory 14. The polarity of the sixteenth sub polarity digital signal is N, and the sixteenth sub polarity digital signal can be transmitted to the memory 16. When the first sub polarity digital signal to the fourth sub polarity digital signal are transmitted to the source driving circuit, the switch SW1 is turned on, the switch SW6 is turned on, the switch SW8 is turned on, the switch SW13 is turned on, the switch SW2 is turned off, the switch SW3 is turned off, the switch SW4 is turned off, the switch SW5 is turned off, the switch SW7 is turned off, the switch SW9 is turned off, the switch SW10 is turned off, the switch SW11 is turned off, and the switch SW12 is turned off. When the fifth sub polarity digital signal to the eighth sub polarity digital signal are transmitted to the source driving circuit, the switch SW1 is turned on, the switch SW6 is turned on, the switch SW7 is turned on, the switch SW13 is turned on, the switch SW2 is turned off, the switch SW3 is turned off, the switch SW4 is turned off, the switch SW5 is turned off, the switch SW8 is turned off, the switch SW9 is turned off, the switch SW10 is turned off, the switch SW11 is turned off, and the switch SW12 is turned off. When the ninth sub polarity digital signal to the twelfth sub polarity digital signal is transmitted to the source driving circuit, the switch SW1 is turned on, the switch SW6 is turned on, the switch SW8 is turned on, the switch SW13 is turned on, the switch SW2 is turned off, the switch SW3 is turned off, the switch SW4 is turned off, the switch SW5 is turned off, the switch SW7 is turned off, the switch SW9 is turned off, the switch SW10 is turned off, the switch SW11 is turned off, and the switch SW12 is turned off. When the 13th sub polarity digital signal to the sixteenth sub polarity digital signal are transmitted to the source driving circuit, the switch SW1 is turned on, the switch SW6 is turned on, the switch SW7 is turned on, the switch SW13 is turned on, the switch SW2 is turned off, the switch SW3 is turned off, the switch SW4 is turned off, the switch SW5 is turned off, the switch SW8 is turned off, the switch SW9 is turned off, the switch SW10 is turned off, the switch SW11 is turned off, and the switch SW12 is turned off. By analogy, PPNN, NNPP, PNNP, NPPN, PNPN, and NPNP can be realized by the pixel matrix driving device of the embodiment, so that the pixel matrix driving device of the embodiment is applicable not only to the conventional polarity inversion mode. It can also be applied to the interleaved polarity inversion method, thereby reducing the horizontal equidistant horizontal stripes of the display panel, and also reducing the temperature at which the driving chip operates.

In the embodiment of the present invention, PPP . . . NNN . . . , NNN . . . PPP . . . can also be realized by increasing the number of the storage units and the number of the source drivers in each storage unit. For example, if the number of memory and source drivers is six, the polarity of the pixel unit can realize the arrangement of PPPNNN and NNNPPP. Therefore, the pixel matrix driving device of the embodiment is applicable not only to the conventional polarity inversion method but also to the interleaved polarity inversion method. Further, the phenomenon of horizontal equidistant horizontal stripes of the display panel is reduced, and the temperature at which the driving chip operates can also be reduced.

The invention realizes the position rearrangement of the first polarity digital signal by the timing controller to obtain the second polarity digital signal, and performing polarity switching and position recovery on the second polarity digital signal after the position rearrangement through the source driving circuit to obtain the first polarity switching signal. The output first polarity switching signal is output to a corresponding position of the display panel, so that the pixel matrix driving device is applicable not only to the conventional polarity inversion mode but also to the interleaved polarity inversion mode. Further, the phenomenon of horizontal equidistant horizontal stripes of the display panel is reduced, and the temperature at which the driving chip operates can also be reduced.

The embodiment of the invention further provides a pixel matrix driving method, the method including:

receiving a first polarity digital signal, and rearranging a polarity position corresponding to the first polarity digital signal to obtain a second polarity digital signal; and performing polarity switching and position recovery on the second polarity digital signal to obtain a first polarity switching signal.

The method of the embodiment of the invention is applicable not only to the traditional polarity inversion mode, but also to the interleaved polarity inversion mode, thereby reducing the horizontal equidistant horizontal stripes of the display panel. It is also possible to reduce the temperature at which the driver chip operates.

The embodiment of the invention further provides a liquid crystal display device including the above-mentioned pixel matrix driving device, so that the horizontal equidistant horizontal stripes of the liquid crystal display device can also reduce the temperature during operation of the driving chip.

Moreover, it will be understood that the foregoing various embodiments are merely illustrative of the invention. The technical solutions of the various embodiments may be used in any combination and in combination in the case that the technical features are not conflicting, the structure is not contradictory, and the object of the invention is not violated.

Finally, it should be noted that the above embodiments are only used to illustrate the technical solutions of the present invention, and are not limited thereto. Although the present invention has been described in detail with reference to the foregoing embodiments, those skilled in the art should understand that the technical solutions described in the foregoing embodiments may be modified or equivalently substituted for some of the technical features. The modifications and substitutions of the present invention do not depart from the spirit and scope of the technical solutions of the embodiments of the present invention.

What is claimed is:

1. A liquid crystal display device, comprising: a timing controller, a source driving circuit, a gate driving circuit, and a liquid crystal display panel, wherein the liquid crystal display panel comprises: a plurality of data lines and a plurality of scan lines, the plurality of data lines intersect with the plurality of scan lines to define X rows and Y columns of pixel units arranged in a matrix, and X and Y are positive integers, S types of different polarity inversion positions exist from an i-th column of pixel unit to an [i+(U−1)]-th column of pixel unit, where $0<i<Y$, $U\geq 4$, $S\geq 2$, and U is a polarity inversion repetition period in a scan line direction;

the timing controller is respectively connected to the source driving circuit and the gate driving circuit and configured to perform timing control on the source driving circuit and the gate driving circuit;

the source driving circuit is connected to the liquid crystal display panel and configured to provide a data driving signal to the plurality of data lines; and the gate driving circuit is connected to the liquid crystal display panel and configured to provide a scan driving signal to the plurality of scan lines;

wherein the source driving circuit is configured to:
- receive a first polarity digital signal and rearrange each polarity position of the first polarity digital signal according to a polarity of each polarity position in the first polarity digital signal to obtain a second polarity digital signal, based on N first switch modules;
- perform polarity conversion on the second polarity digital signal to obtain a first polarity conversion signal, based on N polarity conversion modules; and
- perform position recovery on a first polarity switching signal according to the polarity of each polarity position in the first polarity digital signal and obtain a second polarity switching signal configured to control the S types of different polarity inversion positions between the i-th column of the pixel unit and the [i+(U−1)]-th column of the pixel unit, based on N second switch modules;

wherein the first polarity digital signal comprises a plurality of sub polarity digital signals, each of the first switch modules is configured to receive the sub polarity digital signals according to a set interval;

wherein each of the polarity conversion modules is one of a positive polarity conversion module and a negative polarity conversion module; when the polarity conversion module corresponding to a K-th stage first switch module is the positive polarity conversion module, the polarity conversion module corresponding to a (K+1)-th stage first switch module is the negative polarity conversion module, where N and K are both positive integers, and 1≤K≤N.

2. The liquid crystal display device according to claim 1, wherein a first stage first switch module and a N-th stage first switch module each comprise one first switch, a second stage first switch module to a (N−1)-th stage first switch module each comprise two first switches and one second switch;

in the first stage first switch module, an input end of the first switch receives the first polarity digital signal, and a first output end of the first switch and a second output end of the first switch respectively connect two polarity conversion modules having different polarity conversion functions;

in a M-th stage first switch module, an input end of the second switch receives the first polarity digital signal, and a first output end of the second switch and a second output end of the second switch are respectively connected to input ends of the two first switches, the first output end of the first switch and the second output end of the first switch are respectively connected to the two polarity conversion modules having different polarity conversion functions, where M is a positive integer, and 1<M<N; and in the N-th stage first switch module, the input end of the first switch receives the first polarity digital signal, and the first output end of the first switch and the second output end of the first switch are respectively connected to the two polarity conversion modules having different polarity conversion functions.

3. The liquid crystal display device according to claim 2, in the first stage first switch module, the input end of the first switch receives the first polarity digital signal, the first output end of the first switch is connected to the first stage polarity conversion module, and the second output end of the first switch is connected to the second stage polarity conversion module;

in the M-th stage first switch module, the input end of the second switch receives the first polarity digital signal, the first output end and the second output end of the second switch are respectively connected to the input ends of the two first switches, the first output ends of the first switches are respectively connected to the polarity conversion module of an upper stage and a lower stage, the second output ends of the first switches are respectively connected to the polarity conversion module of the current stage and the polarity conversion module of the lower/upper stage; and in the N-th stage first switch module, the input end of the first switch receives the N-th polarity digital signal, the first output end of the first switch is connected to the (N−1)-th stage polarity conversion module, and the second output end of the first switch is connected to the N-th stage polarity conversion module.

4. The liquid crystal display device according to claim 2, wherein the source driving circuit further comprises a data latch unit and a level shifting unit, the data latch unit comprises N data latches, the level shifting unit comprises N level shifters, and a P-th stage data latch and a P-th stage level shifter are sequentially connected between a P-th stage switching module and a P-th stage polarity conversion module, where P is a positive integer and 1≤P≤N.

5. The liquid crystal display device according to claim 2, wherein the second polarity switching signal comprises a plurality of sub polarity conversion signals, each of the second switch modules is configured to output the sub polarity conversion signal according to a polarity of each of the polarity positions of the first polarity digital signal.

6. The liquid crystal display device according to claim 5, wherein a first stage second switch module and a N-th stage second switch module respectively comprise a third switch, a second stage second switch module to a (N−1)-th stage second switch module respectively comprises two third switches and one fourth switch;

in the first stage second switch module, a first input end and a second input end of the third switch are respectively connected to the two polarity conversion modules having different polarity conversion functions, an output end of the third switch outputs a second polarity switching signal;

in a M-th stage second switch module, the first input end and the second input end of the third switch are respectively connected to the two polarity conversion modules having different polarity conversion functions, the output end of the third switch is connected to an input end of the fourth switch, an output end of the fourth switch outputs a second polarity switching signal; and in the N-th stage second switch module, the first input end and the second input end of the third switch are respectively connected to the two polarity conversion modules having different polarity conversion functions, the output end of the third switch outputs a second polarity switching signal.

7. The liquid crystal display panel according to claim 6, wherein in the first stage second switch module, the first input end of the third switch is connected to the first stage polarity conversion module, the second input end of the third switch is connected to the second stage polarity conversion module, the output end of the third switch outputs a second polarity switching signal;

in the M-th stage second switch module, the first input end of the third switch is respectively connected to an upper stage and a lower stage polarity conversion module, the second input end of the third switch is respectively connected to the current stage polarity conversion module and the lower/upper stage polarity conversion module, the output end of the third switch is connected to the input end of the fourth switch, and the output end of the fourth switch outputs a second polarity switching signal; and in the N-th stage second switch module, the first input end of the third switch is connected to the N-th of stage the polarity conversion module, the second input end of the third switch is connected to the (N−1)-th stage polarity conversion module, the output of the third switch outputs a second polarity switching signal.

8. The liquid crystal display device according to claim 6, wherein the source driving circuit further comprises an output buffer unit, configured to buffer the first second polarity switching signal, the output buffer unit comprises N output buffers, and a q-th stage output buffer is connected between a q-th stage polarity conversion module and a q-th stage second switch module, where q is a positive integer and $1 \leq q \leq N$.

9. A liquid crystal display device, comprising: a timing controller, a source driving circuit, a gate driving circuit, and a liquid crystal display panel, wherein the liquid crystal display panel comprises: a plurality of data lines and a plurality of scan lines, the plurality of data lines intersect with the plurality of scan lines to define X rows and Y columns of pixel units arranged in a matrix, and X and Y are positive integers, S types of different polarity inversion positions exist from an i-th column of pixel unit to an [i+(U−1)]-th column of pixel unit, where $0<i<Y$, $U \geq 4$, $S \geq 2$, and U is a polarity inversion repetition period in a scan line direction;

the timing controller is respectively connected to the source driving circuit and the gate driving circuit and configured to perform timing control on the source driving circuit and the gate driving circuit;

the source driving circuit is connected to the liquid crystal display panel and configured to provide a data driving signal to the plurality of data lines;

the gate driving circuit is connected to the liquid crystal display panel and configured to provide a scan driving signal to the plurality of scan lines;

wherein the timing controller is configured to receive a first polarity digital signal, and rearrange the polarity positions corresponding to the first polarity digital signal to obtain a second polarity digital signal;

wherein the source driving circuit is configured to perform polarity switching and position recovery on the second polarity digital signal to obtain a first polarity switching signal for controlling the S types of different polarity inversion positions between the i-th column of the pixel unit and the [i+(U−1)]-th column of the pixel unit;

wherein the source driving circuit is concretely configured to:
perform polarity switching on the second polarity digital signal to obtain a second polarity switching signal, based on N polarity conversion modules; and
perform position recovery on the second polarity switching signal according to a position of the first polarity digital signal to obtain the first polarity switching signal, based on N switch recovery modules;

wherein each of the N polarity conversion modules is one of a positive polarity conversion module and a negative polarity conversion module; when a K-th stage polarity conversion module is the positive polarity conversion module, a (K+1)-th stage polarity conversion module is the negative polarity conversion module, where N and K are positive integers, and $1 \leq K \leq N$;

wherein the second polarity switching signal comprises a plurality of sub polarity conversion signals, the switch recovery module is configured to perform position recovery on the sub polarity conversion signal according to a position of the first polarity digital signal, a K-th stage switch recovery module comprises a plurality of switches, the input of which is connected to the K-th stage polarity conversion module, and the output of the switch is configured to control the polarity of different first polarity digital signals.

10. The liquid crystal display device according to claim 9, wherein the timing controller comprises a plurality of storage units, each storage unit comprises N storages, and the first polarity digital signal comprises a plurality of sub polarity digital signals, each of the storages configured to receive one sub polarity digital signal according to a preset rule.

11. The liquid crystal display device according to claim 9, wherein the source driving circuit further comprises a data latch unit and a level shifting unit, the data latch unit comprises N data latches, and the level shifting unit comprises N level shifters, a K-th stage data latch and a K-th stage level shifter of are sequentially connected between a K-th stage storage unit of and the K-th stage polarity conversion module; and the source driving circuit further comprises an output buffer unit, and the output buffer unit comprises N output buffers, a K-th stage output buffer is connected between the K-th stage polarity conversion module and the K-th stage switch recovery module.

* * * * *